United States Patent
Zur et al.

(10) Patent No.: US 12,141,093 B1
(45) Date of Patent: Nov. 12, 2024

(54) RENDEZVOUS FLOW WITH RDMA (REMOTE DIRECT MEMORY ACCESS) WRITE EXCHANGE

(71) Applicant: Habana Labs Ltd., Caesarea (IL)

(72) Inventors: Itay Zur, Hod Hasharon (IL); Ira Joffe, Gedera (IL); Shlomi Gridish, Tel Aviv (IL); Amit Pessach, Kiryat Ono (IL); Yanai Pomeranz, Tel Aviv (IL)

(73) Assignee: Habana Labs Ltd., Caesarea (IL)

( * ) Notice: Subject to any disclaimer, the term of this patent is extended or adjusted under 35 U.S.C. 154(b) by 370 days.

(21) Appl. No.: 17/584,162

(22) Filed: Jan. 25, 2022

Related U.S. Application Data

(60) Provisional application No. 63/292,767, filed on Dec. 22, 2021.

(51) Int. Cl.
| | | |
|---|---|---|
| *G06F 9/54* | (2006.01) | |
| *G06F 15/167* | (2006.01) | |
| *G06F 15/173* | (2006.01) | |
| *H04L 49/90* | (2022.01) | |

(52) U.S. Cl.
CPC ...... *G06F 15/17331* (2013.01); *G06F 15/167* (2013.01); *H04L 49/9036* (2013.01)

(58) Field of Classification Search
CPC ............. G06F 15/17331; G06F 15/167; H04L 49/9036
See application file for complete search history.

(56) References Cited

U.S. PATENT DOCUMENTS

| | | | | |
|---|---|---|---|---|
| 5,159,671 A | * | 10/1992 | Iwami | G06F 13/28 714/6.32 |
| 5,878,217 A | * | 3/1999 | Cherukuri | G06F 13/387 709/212 |
| 6,115,803 A | * | 9/2000 | Hayashi | G06F 9/54 709/206 |
| 6,463,478 B1 | * | 10/2002 | Lau | H04L 47/30 709/224 |
| 7,904,614 B1 | * | 3/2011 | Marshall | G06F 13/28 710/28 |
| 8,437,409 B2 | * | 5/2013 | Scherlis | H04N 21/435 370/350 |
| 8,458,280 B2 | * | 6/2013 | Hausauer | H04L 67/1097 709/212 |
| 8,548,900 B1 | * | 10/2013 | Glackin | G06Q 40/06 705/37 |

(Continued)

*Primary Examiner* — Nicholas P Celani
*Assistant Examiner* — Wuji Chen
(74) *Attorney, Agent, or Firm* — Akona IP PC

(57) ABSTRACT

A system includes a first processing device and a second processing device, each of which is coupled to a NIC implemented with an RDMA interface. The NICs are capable of rendezvous flows of RDMA write exchange. In an example where the first NIC is at the sender side and the second NIC is at the receiver side, a rendezvous flow is initiated by an execution of a RDMA write operation by the second NIC. The second NIC provides at least an address of a buffer in the second processing device to the first NIC through the RDMA write operation. Then the first NIC initiates a RDMA write operation to send data in a buffer in the first processing device to the second NIC. The second NIC may acknowledge receipt of the data with the second NIC. The second NIC can update a CI of the WQE based on the acknowledgement.

10 Claims, 12 Drawing Sheets

(56) References Cited

U.S. PATENT DOCUMENTS

| | | | | |
|---|---|---|---|---|
| 8,930,568 | B1* | 1/2015 | Chalmer | G06F 13/10 707/705 |
| 10,031,861 | B2* | 7/2018 | Chhabra | H04L 9/0637 |
| 10,079,916 | B2* | 9/2018 | Roberts | H04L 45/74 |
| 10,542,055 | B2* | 1/2020 | Abernethy, Jr. | G06Q 10/10 |
| 11,182,221 | B1* | 11/2021 | Sivaramakrishnan | G06F 30/34 |
| 11,785,087 | B1* | 10/2023 | Marcovitch | H04L 67/1097 709/217 |
| 11,876,642 | B2* | 1/2024 | Graham | H04L 12/44 |
| 11,876,885 | B2* | 1/2024 | Levi | H04L 7/0091 |
| 11,880,711 | B2* | 1/2024 | Nudelman | G06F 9/4881 |
| 2004/0017819 | A1* | 1/2004 | Kagan | H04L 49/9047 370/428 |
| 2005/0050244 | A1* | 3/2005 | Oda | G06F 12/0868 710/33 |
| 2005/0135395 | A1* | 6/2005 | Fan | H04L 49/9026 370/412 |
| 2005/0141434 | A1* | 6/2005 | Cornett | H04L 49/9052 370/252 |
| 2006/0179255 | A1* | 8/2006 | Yamazaki | G06F 15/167 711/147 |
| 2007/0208820 | A1* | 9/2007 | Makhervaks | H04L 67/10 709/212 |
| 2008/0162663 | A1* | 7/2008 | Schlansker | H04L 49/90 709/217 |
| 2008/0181245 | A1* | 7/2008 | Basso | H04L 47/50 370/412 |
| 2008/0301327 | A1* | 12/2008 | Archer | G06F 13/28 710/22 |
| 2008/0313661 | A1* | 12/2008 | Blocksome | G06F 9/52 719/330 |
| 2009/0006605 | A1* | 1/2009 | Chen | H04L 49/9021 709/224 |
| 2009/0006662 | A1* | 1/2009 | Chen | G06F 13/28 710/22 |
| 2009/0006800 | A1* | 1/2009 | Bellofatto | G06F 9/3851 711/170 |
| 2010/0008378 | A1* | 1/2010 | Luan | H04L 47/29 370/415 |
| 2010/0268852 | A1* | 10/2010 | Archer | G06F 13/28 710/22 |
| 2010/0274868 | A1* | 10/2010 | Arroyo | G06F 9/52 709/212 |
| 2011/0047629 | A1* | 2/2011 | Mitchell | G06Q 30/018 705/317 |
| 2012/0331243 | A1* | 12/2012 | Aho | G06F 12/1081 711/E12.001 |
| 2013/0007181 | A1* | 1/2013 | Sugumar | G06F 9/5027 709/212 |
| 2013/0054858 | A1* | 2/2013 | Bugge | G06F 13/24 710/263 |
| 2013/0103777 | A1* | 4/2013 | Kagan | H04L 49/901 709/212 |
| 2014/0337939 | A1* | 11/2014 | Nomura | H04N 21/41407 726/28 |
| 2015/0026286 | A1* | 1/2015 | Sharp | H04L 67/1097 709/212 |
| 2015/0039793 | A1* | 2/2015 | Rossetti | G06F 13/385 710/105 |
| 2015/0085880 | A1* | 3/2015 | An | H04L 67/10 370/474 |
| 2015/0172370 | A1* | 6/2015 | Marusi | H04L 67/10 709/217 |
| 2016/0026605 | A1* | 1/2016 | Pandit | G06F 15/17331 709/212 |
| 2016/0132251 | A1* | 5/2016 | Hwang | G06F 3/0679 711/154 |
| 2016/0132271 | A1* | 5/2016 | Takada | G06F 3/0659 711/154 |
| 2016/0342567 | A1* | 11/2016 | Tsirkin | H04L 49/901 |
| 2016/0350244 | A1* | 12/2016 | Tsirkin | G06F 3/0664 |
| 2017/0013143 | A1* | 1/2017 | Arita | H04N 1/00095 |
| 2017/0149924 | A1* | 5/2017 | Peterson | H04L 67/5682 |
| 2017/0279867 | A1* | 9/2017 | Morton | H04W 4/21 |
| 2018/0074983 | A1* | 3/2018 | Kawashima | G06F 12/1081 |
| 2018/0143924 | A1* | 5/2018 | Fu | G06F 13/28 |
| 2018/0203601 | A1* | 7/2018 | Birchfield | G06F 21/31 |
| 2018/0365176 | A1* | 12/2018 | Finkelstein | H04L 47/34 |
| 2019/0034381 | A1* | 1/2019 | Burstein | H04L 67/1097 |
| 2019/0171612 | A1* | 6/2019 | Shahar | G06F 15/167 |
| 2019/0303297 | A1* | 10/2019 | Fleming, Jr. | G06F 13/1668 |
| 2019/0324926 | A1* | 10/2019 | Wu | G06F 13/1663 |
| 2020/0026656 | A1* | 1/2020 | Liao | H04L 67/1097 |
| 2020/0068050 | A1* | 2/2020 | Foo | G06F 9/30098 |
| 2020/0371700 | A1* | 11/2020 | Stabrawa | G06F 3/0631 |
| 2021/0073158 | A1* | 3/2021 | Badger | H04L 47/6215 |
| 2021/0218808 | A1* | 7/2021 | Graham | H04L 67/566 |
| 2021/0359955 | A1* | 11/2021 | Musleh | G06F 15/17331 |
| 2022/0147276 | A1* | 5/2022 | Watanabe | G06F 3/0604 |
| 2022/0198117 | A1* | 6/2022 | Raumann | G06F 9/5011 |
| 2022/0217098 | A1* | 7/2022 | Niu | H04L 49/901 |
| 2022/0236908 | A1* | 7/2022 | Lu | G06F 3/064 |
| 2022/0368743 | A1* | 11/2022 | Miller | H04L 65/611 |
| 2023/0047600 | A1* | 2/2023 | Kim | H04L 51/10 |
| 2023/0267022 | A1* | 8/2023 | Han | G06F 13/28 709/212 |
| 2023/0342087 | A1* | 10/2023 | He | G06F 3/0604 |
| 2023/0362032 | A1* | 11/2023 | Naka | H04L 12/46 |

\* cited by examiner

RENDEZVOUS FLOW WITH RDMA (REMOTE DIRECT MEMORY ACCESS) WRITE EXCHANGE

CROSS REFERENCE TO RELATED APPLICATION

This application claims the benefit of U.S. Provisional Patent Application No. 63/292,767, filed Dec. 22, 2021, which is incorporated by reference its entirety.

TECHNICAL FIELD

This disclosure relates generally to RDMA, and more specifically, to rendezvous flows with RDMA write exchange.

BACKGROUND

Direct Memory Access (DMA) is an ability of accessing (e.g., reading from or writing to) host memory directly without CPU (central processing unit) intervention. RDMA is an extension of the DMA technology. RDMA is the ability of accessing memory on a remote device without interrupting the processing of the CPU(s) on that remote device. This permits high-throughput, low-latency networking, which is especially useful in massively parallel computer clusters.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
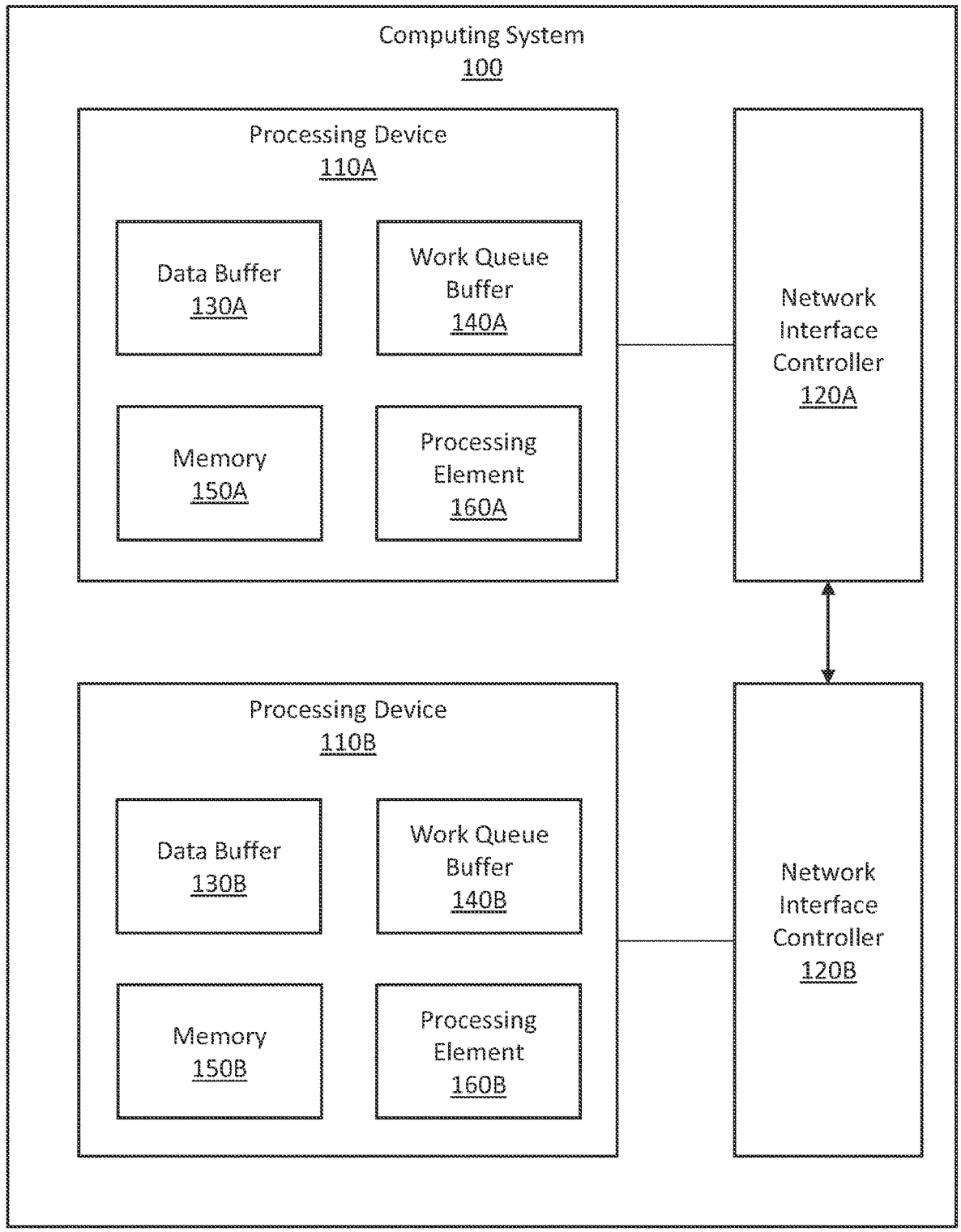
FIG. 1 illustrates an architecture of an example computing system capable of rendezvous flow with RDMA write exchange, in accordance with various embodiments.

RDMA allows for accessing memory data from one host to another host without involving either one's operating system, cache, or processor. RDMA supports zero-copy networking, through which data can be transferred from the send node to the receive node without the network software stack involvement and data can be sent directly to the buffers without being copied between the network layers. Unnecessary data copies can be avoided in zero-copy RDMA operations. Also, RDMA does not require CPU involvement. The CPU does not perform the task of copying data from one memory area to another. Applications can access remote memory without consuming any CPU in the remote device. The remote memory will be read without any intervention of the remote processor. The caches in the remote CPU(s) won't be filled with the accessed memory content. This reduces latency in data transfer. RDMA facilitates more direct and efficient data movement into and out of a server by implementing a transport protocol in the NIC located on each host. For example, two networked computers can each be configured with a NIC that supports the RDMA over Converged Ethernet (RoCE) protocol, enabling the computers to carry out RoCE-based communications.

However, RDMA presents several problems related to the fact that the send node is not notified of the address of the receive buffer. Taking a MPI (message passing interface) operation for example, the MPI operation usually includes two pointers: one for the send buffer (i.e., the buffer of the send node, from which data is read) and another for the receive buffer (i.e., the buffer of the receive node, to which data is written). In order to map the MPI operation to RDMA write or RDMA read, an out of band address resolution is needed. However, mapping the MPI operation to RDMA send operation can cause a lot of retries on the network since the execution of the send and receive operation cannot be synchronized.

A common solution to this problem is that after the send node sends data to the receive node, the send node "knocks" the receive node to request the receive node to acknowledge the receipt of the data. The receive node can execute the sender packet if the address of the receive buffer is available and then an acknowledge packet will be sent back to the send node. However, the receive node may fail to acknowledge despite the request from the send node or may return an error message, such as a RNR (receiver not ready) NACK (negative act). In such scenarios, the send node has to wait and knock again later. The send node may have to wait and knock multiple times till the receiver returns an acknowledgement. This creates a bottleneck for the next send and receive operation. Therefore, improved technology for synchronizing RDMA send and receive operations are needed.

Embodiments of the present invention relate to computing systems capable of rendezvous flows with RDMA write exchange. An example computing system includes a send device and a receive device. The send device includes a processing device (first processing device) and a NIC (first NIC). The receive device also includes a processing device (second processing device) and a NIC (second NIC). The first processing device includes a data buffer (also referred to as "send buffer") that stores data to be sent to the receive device. The data can be read from the send buffer by a RDMA read operation. The second processing device includes a data buffer (also referred to as "receive buffer") for storing data from the send device. Data can be written to the receive buffer by a RDMA write operation. The first processing device also includes a work queue buffer that stores a work queue. The work queue buffer includes a plurality of slots where work queue elements (WQEs) can be placed. A slot is a portion of the work queue buffer that can store a WQE at a time. A slot has an index indicating a position of the slot in the work queue. The index can also be the index of the WQE in the slot. A WQE includes information needed for sending data from the send buffer to the receive buffer. For instance, the WQE includes an address of the send buffer (also referred to as "local address") and an address of the receive buffer (also referred to as "remote address"). The work queue has a producer index (PI), which refers to the next slot where a new WQE can be placed. The PI may equal the index of the last WQE in the work queue plus 1. The work queue also has a consumer index (CI), which refers to the next WQE to be processed and completed. The CI may be the same as the index of the next WQE.

A rendezvous flow is initiated by the second NIC. The second NIC executes a RDMA write operation to provide the first NIC a packet that includes the receiver buffer address. The packet can also be referred to as rendezvous receive packet or address packet. The first NIC can update the work queue based on the address packet. For instance, the first NIC places a WQE, which includes the send buffer address and the receive buffer address, into a slot of work queue and increases the PI of the work queue by 1. In embodiments where the WQE is the first WQE in the work queue, the WQE has an index of 0, the PI is updated from 0 to 1, the CI remains 0.

Then the first NIC processes the WQE. The first NIC performs a RDMA write operation to send another packet to the second NIC. This packet includes data in the send buffer and is referred to as a data packet. The second NIC, after receiving the packet from the first NIC, may provide an acknowledgement packet on the data packet (i.e., an acknowledgement of receiving the data packet) to the first NIC. After receiving the acknowledgement packet, the first NIC can update the CI. In the example where the WQE is the first WQE in the work queue, the CI is updated from 0 to 1, indicating the index of the next WQE to be processed is 1. The first NIC may remove the WQE from the work queue before or after it processes the next WQE, if any.

The work queue can include multiple WQEs, each of which corresponds to a data transfer task. The first NIC may process the WQEs in order, e.g., by a first in, first out (FIFO) method. The second NIC may send out multiple rendezvous receive packets in a row. The first NIC may be able to process the rendezvous receive packets at the same time by inserting a WQE into the work queue for each rendezvous receive packet. However, there is a risk of overflowing the work queue. The second NIC can track occupancy of the work queue on the sender side to prevent overflowing the work queue.

In some embodiments, the second NIC maintains a PI and a CI at the receiver side to avoid this risk. The PI and CI maintained by the second NIC are referred to as remote PI and remote CI, respectively, since they are remote to the work queue on the sender side, versus the PI and CI maintained by the first NIC are referred to as local PI and local CI. Every time after the second NIC sends an address packet to the first NIC, the second NIC updates the remote PI, e.g., by incrementing the remote PI by 1. The second NIC can update the remote CI based on information received from the first NIC. For instance, the first NIC sends the latest local CI to the second NIC, then the second NIC updates the remote CI based on the latest local CI.

The second NIC calculates the occupancy of the work queue by subtracting the remote CI from the remote PI. In embodiments where the occupancy exceeds the size of the work queue, the second NIC will not send a new address packet to the first NIC. The approach of including the CI in the data packet is a piggyback approach as the CI is piggybacked on the data packet sent by the first NIC. In other embodiments, the first NIC can send the CI to the second NIC through explicit packet (i.e., a packet that is separate from the data packet) and the CI is not piggybacked on the data packet.

Fences can be implemented in the work queue buffer. The work queue buffer may include multiple sections. Each section can include one or more WQEs and is associated with a fence. The fence of a section prevents the first NIC from processing the WQE(s) in the section before the acknowledgement on a different section is received from the second NIC. Taking a work queue including four sections for example, the fences prevent a section from being processed until all previous sections but the last one is acknowledged and made sure that updated CI is sent to the second NIC. The fences can prevent a deadlock of the work queue, e.g., in embodiments where the piggyback approach is used.

Through the RDMA write exchange between the two NICs, data transfer can be done through the rendezvous flows. The computing system can avoid the necessity of sending RNR NACK on the network while keeping zero copy. Thus, compared with the common solution to the asynchronization between RDMA send and receive, this invention is more advantageous.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example Computing System for RDMA Operations

FIG. 1 illustrates an architecture of an example computing system 100 capable of rendezvous flow with RDMA write exchange, in accordance with various embodiments. The computing system 100 includes processing devices 110A-B (collectively referred to as "processing devices 110" or "processing device 110") and NICs 120A-B (collectively referred to as "NICs 120" or "NIC 120"). In other embodiments, the computing system 100 may include fewer, more, or different components. For instance, the computing system 100 may include more than two processing devices and more than two NICs. In some embodiments, the computing system 100 is implemented on a same integrated circuit or a same chip.

Each processing device 110 is coupled to a NIC 120. A NIC 120 is a hardware component that connects the corresponding processing device 110 to a network in the computing system 100. The NICs 120 are communicatively coupled to each other. The NICs 120 can communicate with each other through the network. In the embodiment of FIG. 1, each NIC 120 provides a RDMA interface to the corresponding processing device 110. A NIC 120 can transfer data to the other NIC 120 through RDMA operations. A RDMA operation may be a RDMA read operation that reads data from a memory (e.g., a buffer) or a RDMA write operation that writes data into a memory (e.g., buffer). With the RDMA interface, the NICs 120 can avoid involvement of the processing devices 110 in data transfers and reduce latency in the data transfers. In an example, the NIC 120A is a send node that can write data stored in the processing device 110A into the processing device 110B through the NIC 120B. The NIC 120B is the receive node. Alternatively, the NIC 120A can be the receive node and the NIC 120B can be the send node. In some embodiments, the NICs 120 are directly interfaced with each other. In other embodiments, the NICs 120 are not directly interfaced.

The processing device 110 is a device or a portion of a device that processes electronic data from registers and/or memory to transform that electronic data into other electronic data that may be stored in registers and/or memory. A processing device 110 may also be referred to as a processor. The processing device 110 may include one or more digital signal processors (DSPs), application-specific ICs (ASICs), CPUs, GPUs, cryptoprocessors (specialized processors that execute cryptographic algorithms within hardware), server processors, or any other suitable processing devices. In the embodiment of FIG. 1, the processing device 110A includes a data buffer 130A, a work queue buffer 140A, a memory 150A, and a processing element (PE) 160A. Similarly, the processing device 110B includes a data buffer 130B, a work queue buffer 140B, a memory 150B, and a PE 160B.

The data buffer 130A stores data that can be sent to the processing device 110B through RDMA operations. The data buffer 130B stores data received from the processing device 110A.

The work queue buffer 140A maintains a work queue for the RDMA operations. The work queue buffer 140B can have similar functions as the work queue buffer 140B in embodiments where the NIC 120B is the send node. The work queue includes a plurality of slots. Each slot has an index, indicating a position of the slot in the work queue. For instance, the first slot (e.g., the slot at the head of the work queue) has an index of 0, the second slot has an index of 1, and so on. In each slot, a WQE can be placed. A WQE has the index of the slot where the WQE is placed. A WQE corresponds to a data transfer task. A WQE includes information of the corresponding data transfer task. The information of a data transfer task includes information of a local address, information of a remote address, etc. The local address is the address of the send buffer from which the data can be read. In the embodiment of FIG. 1, the send buffer is the data buffer 130A. The remote address is the address of the receive buffer, to which the data can be written. In the embodiment of FIG. 1, the receive buffer is the data buffer 130B. In some embodiments, the remote address is provided by the NIC 120B. For instance, the NIC 120B executes a RDMA write operation to write the remote address into the work queue buffer 140A through the NIC 120A. In other embodiments, the NIC 120B provides both the local address and the remote address through the RDMA write operation. A WQE can contain a pointer to the data buffer 130A, e.g., to a message stored in the data buffer 130A that is to be sent to the data buffer 130B.

The WQEs in the work queue can be processed in order. In some embodiment, the WQEs are organized by a FIFO method, i.e., the WQE at the head of the work queue is processed first and the WQE at the tail of the work queue is processed last. In other embodiments, the WQEs can be organized by different methods, such as LIFO (last in, first out). More details about the work queue buffer 140A are described below in conjunction with FIGS. 2 and 4.

The work queue has a PI and a CI. The PI is the index of the next slot in the work queue where a new WQE can be placed. The value of the PI can equal 1 plus the index of the latest WQE in the work queue. Each time a new WQE is inserted into the work queue (e.g., inserted to the tail of the work queue), the PI is incremented by 1. For instance, when the work queue is empty, PI=0. The first WQE will be written to index 0 and the PI will be incremented to 1, the next WQE will be written to index 1 and the PI will be incremented to 2, and so on. The CI is the index of the next WQE to be completed. The CI may be equal to the index of the next WQE. Each time a WQE is completed, the CI is incremented by 1, indicating the WQE at index 1 is to be completed. For instance, CI=0 indicates no WQE has been completed; versus CI=1 indicates the first WQE in the work queue has been completed. A completed WQE can be removed from the work queue. The work queue occupancy equals the difference between the PI and the CI. In an example where there are three WQEs in the work queue including four slots, the work queue has PI=3. The PI points to the fourth slot in the work queue where a new WQE can be placed. In the same example, when the first WQE has been completed but the second WQE and third WQE are not completed, the work queue has CI=1, as the CI is incremented from 0 to 1 when the first WQE is completed. The work queue occupancy in the example is 3−1=2. The second slot and the third slot of the work queue are occupied but the first slot became available when the first WQE is completed.

The rendezvous flow of a RDMA operation can start with execution of the NIC 120B. As the NIC 120B is executed, it will initiate a RDMA write operation to transmit a RDMA write packet to the NIC 120A. The packet includes a buffer address (e.g., the address of the data buffer 130B, or both the address of the data buffer 130B and the address of the data buffer 130A) and a PI. For instance, the NIC 120B executes a RDMA write operation to write the buffer address and PI into the work queue buffer 140B through the NIC 120A. As the PI is from the NIC 120B, which is remote from the NIC 120A, the PI is referred to as a remote PI.

The execution of the NIC 120A may be triggered by receiving the packet. As the NIC 120A is executed, the NIC 120A updates the work queue in the work queue buffer 140A with the buffer address and PI. For instance, the NIC 120A inserts a new WQE into the tail of the work queue and generates a local PI for the new WQE, e.g., by incrementing the PI of the existing WQE at the tail of the work queue by 1. In embodiments where the work queue has no existing WQEs, the NIC 120A can put the new WQE at the head of the work queue so that the new WQE is the first WQE in the work queue.

After the update of the work queue, the NIC 120A can process the WQE. As the WQE has both the address of the data buffer 130A and the address of the data buffer 130B, the NIC 120A can execute a RDMA write operation and moves data stored in the data buffer 130A to the data buffer 130B through the NIC 120B. In some embodiments, the NIC 120A also sends the CI of the WQE to the NIC 120B as part of the data packet. After the NIC 120B receives the data packet, the NIC 120B can update the CI, for instance, from 0 (indicating the RDMA operation is incomplete) to 1 (indicating the RDMA operation is complete). As the CI is updated at the receiver side, the CI is referred to as a remote CI. After the CI was received by NIC 120B, the NIC 120B updates the remote CI and uses the updated remote CI to calculate the work queue occupancy. Additionally or alternatively, the NIC 120A can remove the WQE from the work queue. More details regarding rendezvous flows with RDMA write exchange are provided below in conjunction with FIGS. 5-8.

In some embodiments, each NIC 120 includes bidirectional QPs to facilitate the RDMA operations executed by the NIC 120. A QP includes a send work queue and a receiver work queue. The send work queue may be stored in the work queue buffer 140A, the receiver work queue may be stored in the work queue buffer 140B. In some embodiments, a QP is configured on a virtual port on the NIC 120. More details regarding QPs are provided below in conjunction with FIG. 3.

The memory 150A or 150B (collectively referred to as "memories 150" or "memory 150") stores other data received, generated, or otherwise associated with the processing device 110. The memory 150 may include one or more random access memories (RAMs) or other types of memories. In the embodiment of FIG. 1, the memory 150 is a component of the processing device 110. In other embodiments, the memory 150 may be external to the processing device 110 but coupled to the processing device 110. An external memory can include one or more memory devices such as volatile memory (e.g., DRAM), nonvolatile memory (e.g., read-only memory (ROM)), flash memory, solid state memory, and/or a hard drive. The external memory may include memory that shares a die with the processing device 110. Additionally or alternatively, the external memory may include one or more non-transitory computer-readable media storing instructions executable to perform operations for accelerating sparse matrix computation in deep learning. The instructions stored in the one or more non-transitory computer-readable media may be executed by the processing device 110.

The PE 160A or 160B (collectively referred to as "PEs 160" or "PE 160") processes data in the processing device 110, e.g., data stored in the memory 150 or data buffer 140. In one example, a PE 160 performs MAC operations on the input data and weights. In some embodiments, the PE may be a neuron in an artificial neural network (ANN). The PE 160 has two input signals, i.e., the input data and the weights, and an output signal, i.e., the result of the MAC operations. In some embodiments, the PE 160 includes an array of multipliers and an arrange of accumulators. Each multiplier performs a multiplication operation on a portion of the input signals. The accumulators perform accumulation operations. The accumulators are connected to each other. In an embodiment, each accumulator corresponds to a different multiplier and receives output of the multiplier as input. Also, the output of an accumulator is sent to other accumulators (and possibly back to itself) as input via the interconnections between the accumulators. The output of an accumulator can incorporate the output of one or more other accumulator through an accumulation operation of the accumulator.

Example Work Queue Buffer

Figure 2:
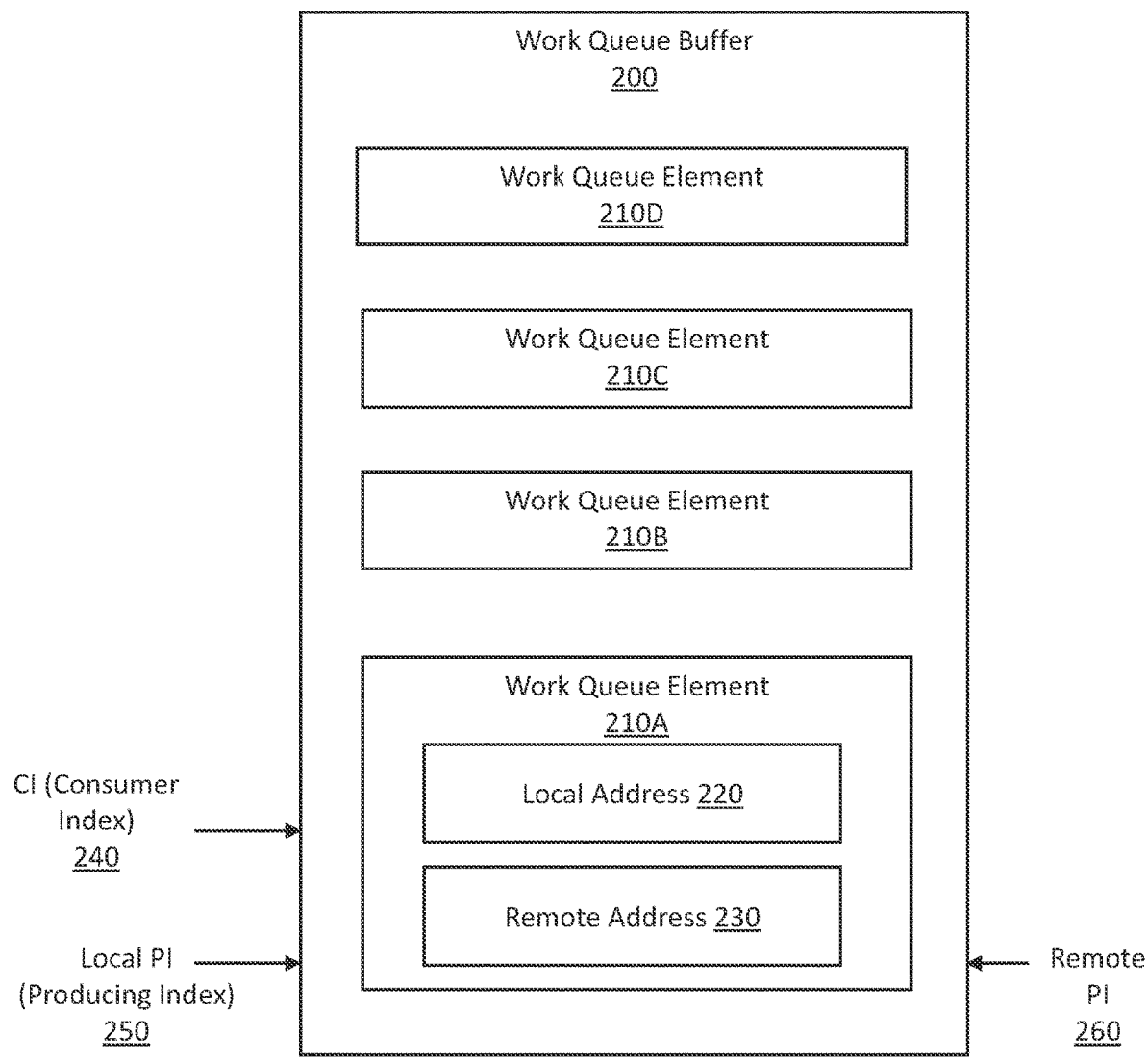
FIG. 2 illustrates an example work queue buffer, in accordance with various embodiments.

FIG. 2 illustrates an example work queue buffer 200, in accordance with various embodiments. The work queue buffer 200 is an embodiment of the work queue buffer 140A in FIG. 1. The work queue buffer 200 includes four WQEs 210A-D (collectively referred to as "WQEs 210" or "WQE 210"). The WQEs 210 are individually placed in different slots of the work queue that are arranged in the work queue in an order. Each WQE 210 has an index indicating the position of the slot in the work queue. In the embodiment of FIG. 2, the WQE 210A has an index of 0, the WQE 210B has an index of 1, the WQE 210C has an index of 2, and the WQE 210D has an index of 3. In other embodiments, the work queue buffer 200 may include a different number of WQEs. Also, the work queue buffer 200 may include slots that are not taken by any WQEs. A WQE 210 can include a local address 220 and a remote address 230 that are needed for transferring data from the sender to the receiver through a RDMA operation. For purpose of simplicity and illustration, in the embodiment of FIG. 2, the WQE 210A includes the local address 220 and a remote address 230, but FIG. 2 does not show buffer addresses for the other WQEs 210.

The local address 220 is an address associated with the data buffer 130A, which is the local buffer as it is local to the sender. In some embodiments, the local address 220 may be the address of the NIC 120A or the processing device 110A in the network in the computing system 100. In some embodiments, the local address 220 is provided by the NIC 120A. For instance, the NIC 120A updates the WQE 210A with the local address 220 after the NIC 120A is executed. In other embodiments, the local address 220 is provided by the NIC 120B. For instance, the NIC 120B notifies the NIC 120A of the local address 220 through RDMA write. The NIC 120A receives the local address 220 and then updates the WQE 210A with the local address 220.

The remote address 230 is an address associated with the data buffer 130B, which is the remote buffer as it is remote from the sender. The remote address 230 may be the address of the NIC 120B or the processing device 110B in the network in the computing system 100. The remote address 230 is provided by the NIC 120A. For instance, the NIC 120B notifies the NIC 120A of the remote address 230 through RDMA write. The NIC 120A receives the remote address 230 and then updates the WQE 210 with the remote address 230. In embodiments where the NIC 120B provides both the local address 220 and the remote address 230, the NIC 120B may transmit the local address 220 and the remote address 230 to the NIC 120A through one RDMA write operation.

The work queue buffer 200 also has a CI 240, a local PI 250, and a remote PI 260. The CI 240 indicates the index of the WQE 210 to be processed and completed next. In an example, the CI 240 has a value of 0 before any of the WQEs 210 have been completed. After the first WQE 210A is completed, the NIC 120 updates the value of the CI 240 to 1, indicating that the WQE 210B, whose index is 1, is to be completed next. Similarly, after the WQE 210B is completed, the CI 240 is updated to 2, indicating that the WQE 210C, whose index is 2, is to be completed next. In some embodiments, the CI 240 is updated locally, i.e., by the NIC 120A, but not remotely.

The local PI 250 is a PI that can be updated by the NIC 120A. The local PI 250 is the index of the slot where a new WQE 210 can be placed. For instance, after the WQE 210C is placed into the work queue buffer 200 but before the WQE 210D is placed into the work queue buffer 140A, the local PI 260 has a value of 3, indicating that a new WQE (i.e., the WQE 210D) can be placed in the slot having the index of 3. The remote PI 260 can be updated by the NIC 120B. In some embodiments, the remote PI and local PI are independent indexes. The local PI is updated in response to that the NIC 120A posts the local address as a part of the WQE. The remote PI is updated in response to that the NIC 120A receives the remote part of the WQE that was sent by 120B. A WQE can be executed when the remote PI and local PI are higher than the index of the WQE. In embodiments where the NIC 120B sends both the local address and remote address of the WQE to the NIC 120A, the remote PI and local PI can be updated together in response to the NIC 120A receiving the local address and remote address. In the example where the WQE 210C has been placed by the WQE 210D is not placed yet, the NIC 120B updates the remote PI 260 from 2 to 3 when it executes a RDMA write operation for the WQE 210D. The NIC 120B may transmit the remote PI 260 to the NIC 120B as a part of the address packet sent through the RDMA write operation. The NIC 120A, after it receives the address packets, updates the local PI 250 to 3 based on the remote PI and places the WQE 210D into the slot having the index of 3.

Example QPs

Figure 3:
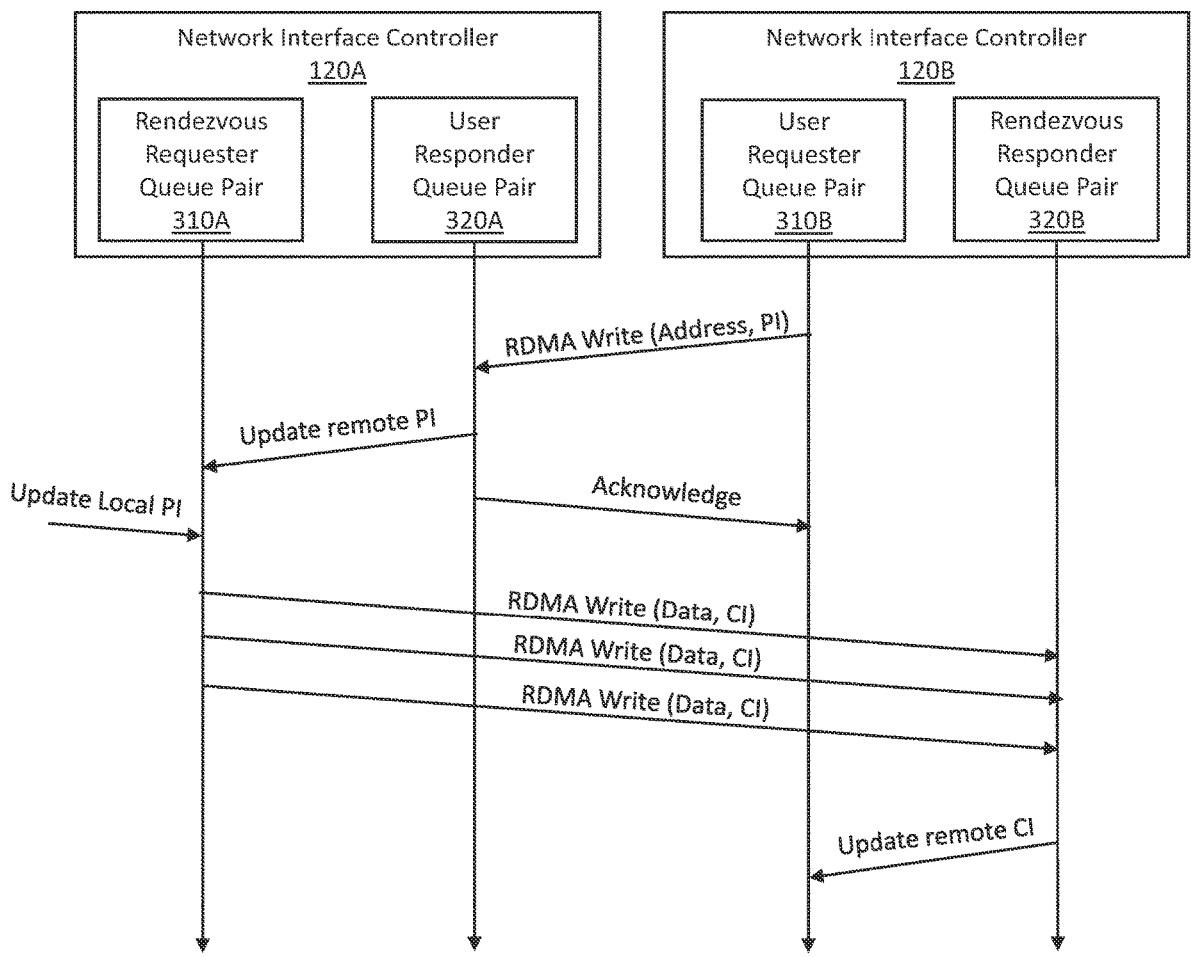
FIG. 3 illustrates bidirectional queue pairs (QPs) of network interface controllers (NICs), in accordance with various embodiments.

FIG. 3 illustrates bidirectional QPs of the NICs 120, in accordance with various embodiments. The NIC 120A includes a rendezvous requester QP 310A and a user responder QP 320A. The NIC 120B includes a user requester QP 310B and a rendezvous responder QP 320B. In some embodiments, the rendezvous requester QP 310A and a user responder QP 320A are bonded together, and the user requester QP 310B and a rendezvous responder QP are bonded together. This bond means that the user responder QP holds the QP number of the requester QP and can initiate an update on the QP number of the requester QP.

As shown in FIG. 3, the user requester QP 310B initiates a RDMA write operation to transmit a packet, which includes an address and a PI, to the user responder QP 320A. The RDMA write operation can be invoked by the execution of the NIC 120B. The address includes a remote address (e.g., the remote address 230 in FIG. 2). The address may also include a local address (e.g., the local address 220 in FIG. 2). The PI is a remote PI (e.g., the remote PI 260 in FIG. 2) and may be part of a remote synchronization object that can facilitate the NIC 120B to manage the work queue at the send side, i.e., the work queue in the work queue buffer 140A. In other embodiments, the address and PI can be sent through separate packets.

In addition to the remote PI, the remote synchronization object may include a remote CI, a remote work queue log size, etc. The user requester QP 310B maintains the remote synchronization object. The user requester QP 310B can increment the remote PI by one for each execution of the NIC 120B. In one example, the remote PI is copied to the packet and will be used by the NIC 120A to calculate the address stored in the corresponding WQE (e.g., the WQE 210A in FIG. 2). The user requester QP 310B maintains the remote CI to make sure that the work queue will not overflow. The rendezvous responder QP 320B may also manage a remote CI that will be updated by the NIC 120A using the RDMA write that transmits the data in the data buffer 130A. The remote work queue log size indicates the size of the work queue. For instance, the size of the work queue equals 2 to the power of the value of the remote work queue log size.

The user responder QP 320A receives the packets and updates a remote PI with the rendezvous requester QP 310A. The rendezvous requester QP 310A updates the local PI at the side of the NIC 120A, e.g., by inserting a new RDMA operation into the work queue in the work queue buffer 140A and incrementing the last PI in the work queue by 1. After the PI is updated, the rendezvous requester QP 310A initiates RDMA write operations to transmit data from the data buffer 130A and CI to the rendezvous responder QP 320B. The rendezvous responder QP 320B receives the data and CI and update the corresponding remote CI, e.g., by changing the value of the remote CI from 0 to 1.

The rendezvous requester QP 310A maintains two types of PIs: local PI and remote PI. The remote PI is provided and updated by the user requester QP 310B. The local PI is updated by the rendezvous requester QP 310A. The actual PI on the QP will be the minimum of the local PI and the remote PI. The QP is scheduled to work in case there is an update in the local PI or the remote PI and the actual PI is not equal to the CI.

The QP from the receiver to the sender can support three flows: RDMA write (e.g., RDMA write from the user requester QP 310B to the user responder QP 320A), RDMA rendezvous write (e.g., RDMA write from the rendezvous requester QP 310A to the rendezvous responder QP 320B), and RDMA read. The possible combinations of those flows include (1) RDMA write & RDMA rendezvous write, (2) RDMA write & RDMA read, etc. Since there is independency between the RDMA rendezvous write, through which data is sent from the data buffer 130A to the data buffer 130B, and the acknowledgement, based on which the CI is updated, the rendezvous requester QP 310A needs to fence WQEs to be able to send the CI to the rendezvous responder QP 320B with the data.

Example Work Queue Buffer

Figure 4:
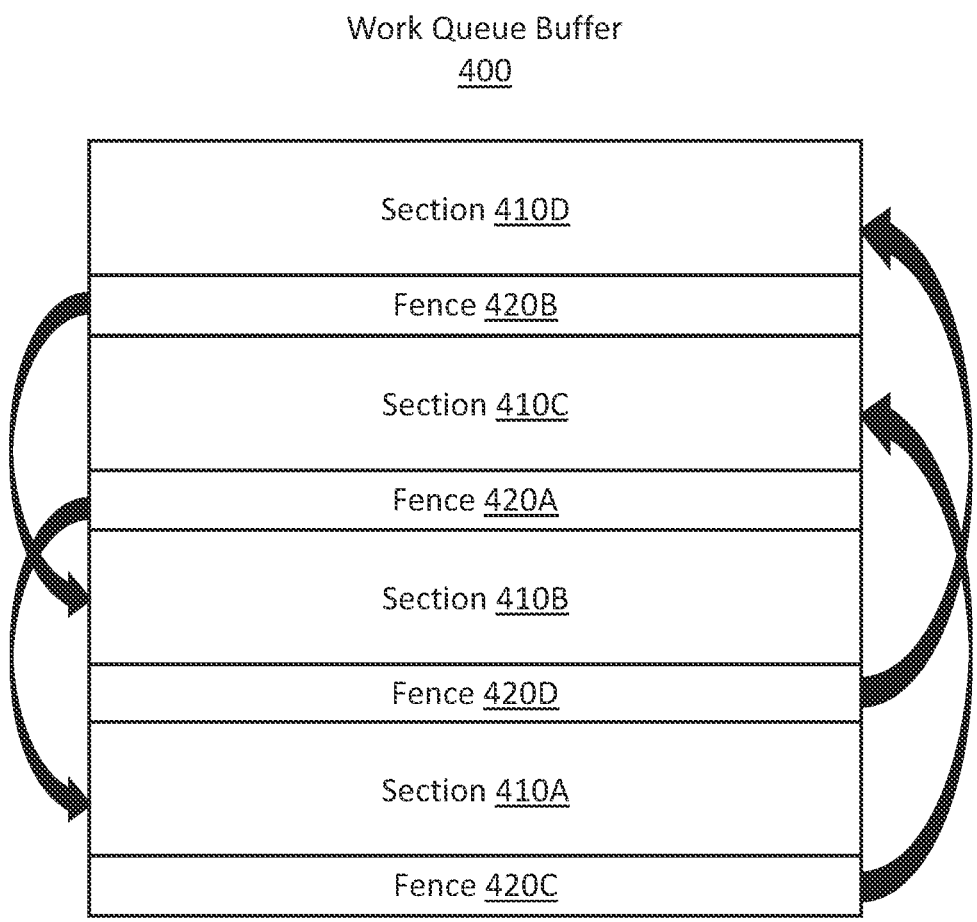
FIG. 4 illustrates an example work queue buffer implemented with fences, in accordance with various embodiments.

FIG. 4 illustrates an example work queue buffer 400 implemented with fences 420A-D, in accordance with various embodiments. The work queue buffer 400 is an embodiment of the work queue buffer 140A in FIG. 1. The work queue buffer 400 includes four sections 410A-D (collectively referred to as "sections 410" or "section 410") that are blocked by the fences 420A-C (collectively referred to as "fences 420" or "fence 420"). In other embodiments, the work queue buffer 400 may include a different number of sections and a different number of fences. The blocks will not cause a performance degradation.

A section 410 includes one or more WQEs, such as the WQEs 210 in FIG. 2. A section may be a slot, or a combination of multiple slots, that is described above in conjunction with FIG. 2. Each section 410 is arranged after (i.e., on top of, as shown in FIG. 4) a fence 420 that is coupled to another section 410. The fence 420 prevents the WQE (or the first WQE if there are multiple WQEs in the section 410) in the section 410 to be executed until acknowledgments have been received for the WQE stored in the other section 410. In other words, the section 410 is blocked by the fence 420. For instance, the section 410A is blocked by the fence 420C, which is coupled to the section 410C. The fence 420C prevents the WQE of the section 410A to be executed until all acknowledgements have been received on the section 410C. Similarly, the section 410B is blocked by the fence 420D, which is coupled to the section 410D. The fence 420D prevents the WQE of the section 410B to be executed until all acknowledgements have been received on the section 410D. The section 410C is blocked by the fence 420A, which is coupled to the section 410A. The fence 420A prevents the WQE of the section 410C to be executed until all acknowledgements have been received on the section 410A. The section 410D is blocked by the fence 420B, which is coupled to the section 410B. The fence 420B prevents the WQE of the section 410D to be executed until all acknowledgements have been received on the section 410B.

For purpose of illustration, FIG. 4 has four sections 410. The WQE in each section 410 is blocked until all acknowledgements has been received on all the previous sections 410 except the last section 410. In other words, the WQE in a section 410 is not blocked even though the acknowledgement on the last previous section 410 is not received. This way, the fences 420 would not cause a performance degradation. By blocking the execution of the WQEs, the fences 420 can prevent the work queue buffer 400 from overflowing. More details regarding functions of the blocks are provided below in conjunction with FIG. 8.

Example Rendezvous Flows

Figure 5:
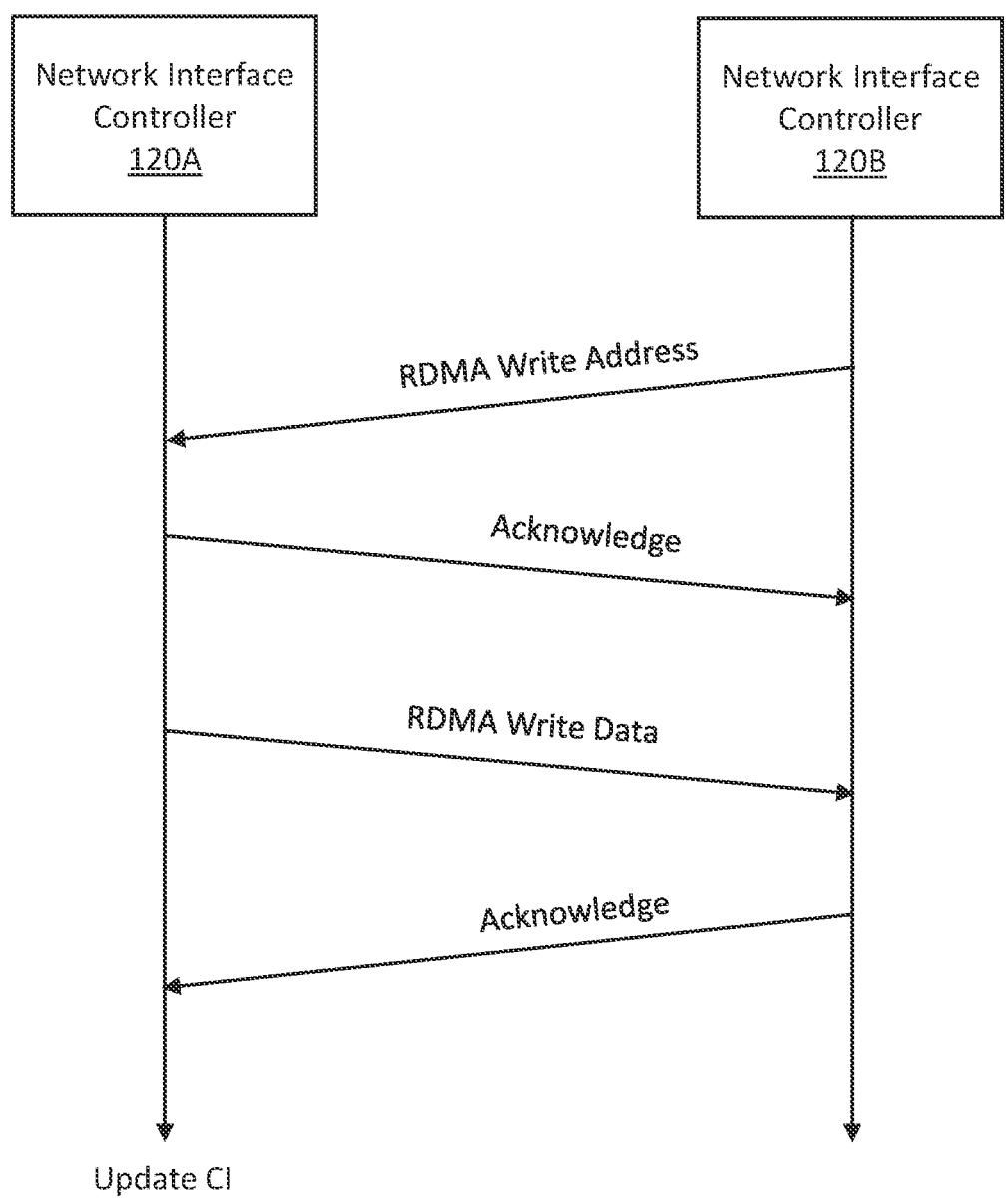
FIG. 5 illustrates an example rendezvous flow with RDMA write exchange, in accordance with various embodiments.

FIG. 5 illustrates an example rendezvous flow with RDMA write exchange, in accordance with various embodiments. The RDMA send and write operations are for a data transfer task corresponding to a WQE in the sender work queue, i.e., the work queue stored in the work queue buffer 140A. In FIG. 5, the NIC 120A is the sender and the NIC 120B is the receiver.

The rendezvous flow is initiated by the NIC 120B. The NIC 120B performs a RDMA write operation to notify the NIC 120A with an address packet. In some embodiments, the address packet includes the address of the data buffer 130B. In some embodiments, the address packet also includes the address of the data buffer 130A. The NIC 120A acknowledges the receipt of the address packet by sending an acknowledgement to the NIC 120B. The address packet is written to the work queue buffer 140A according to the remote PI. In case where the address packet includes the address of the data buffer 130B but does not include the address of the data buffer 130A, the NIC 120A can update the work queue with the buffer address by inserting a new WQE into an available slot of the work queue based on the local PI of the work queue. The new WQE includes both the address of the data buffer 130B and the address of the data buffer 130A. After that, the NIC 120A processes the WQE by initiating a RDMA write operation to send a data packet to the NIC 120B. The data packet includes the data stored in the data buffer 130A. The NIC 120B then writes the data into the data buffer 130B.

The NIC 120B, after it receives the data, acknowledges the receipt of the data packet with the NIC 120A. After the NIC 120A receives the acknowledgment on the data packet, it increments the CI of the work queue by 1. The WQE, which has been completed, can be removed from the work queue in the work queue buffer 140A. In some embodiments, the NIC 120B may have a remote copy of the CI. For instance, after the NIC 120A updates the CI, the NIC 120A can provide the latest CI to the NIC 120B, either by sending an explicit packet with the CI to the NIC 120B or by piggybacking the CI on the next data packet to be sent from the NIC 120A to the NIC 120B.

Figure 6:
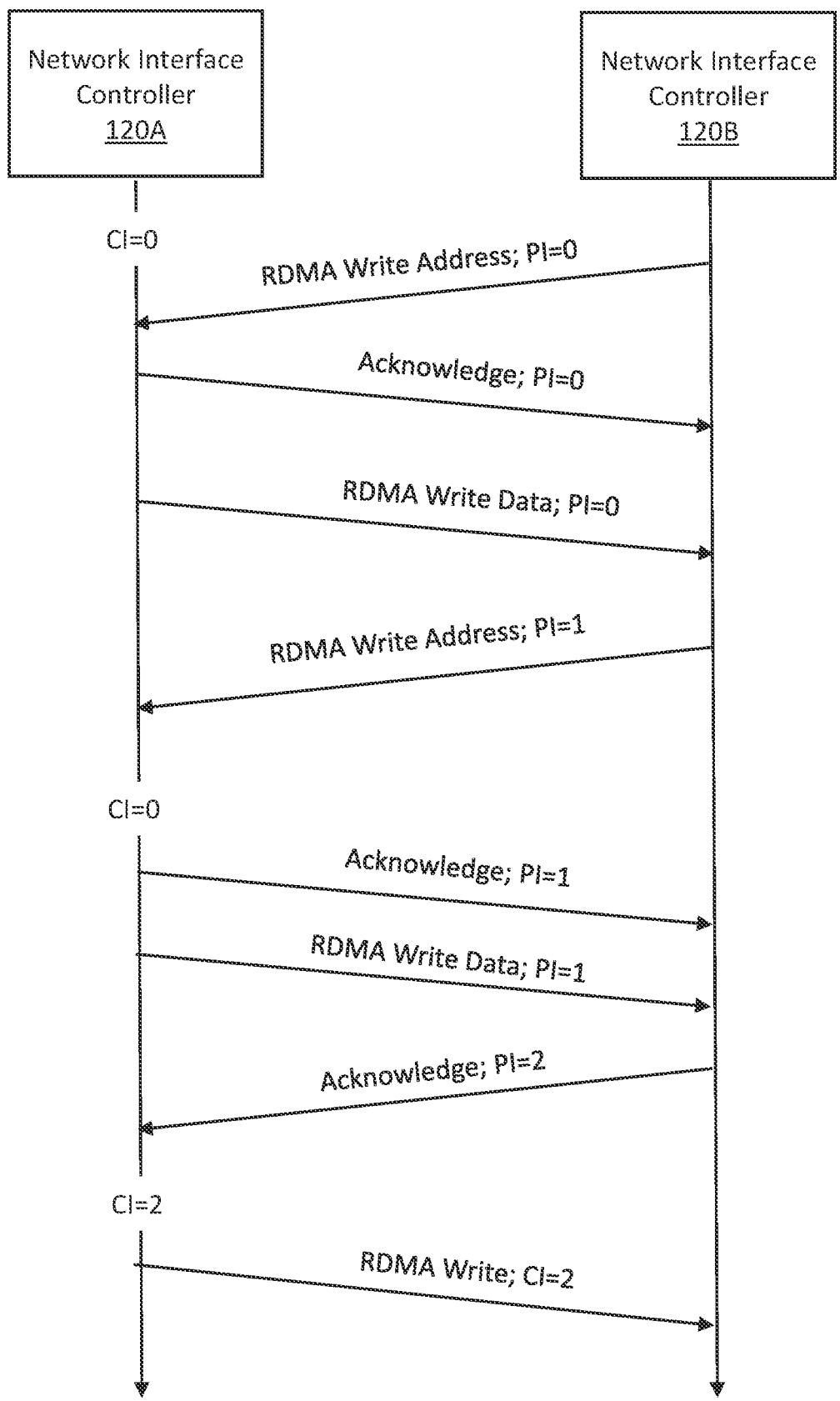
FIG. 6 illustrates another example rendezvous flow with RDMA write exchange, in accordance with various embodiments.

FIG. 6 illustrates another example rendezvous flow with RDMA write exchange, in accordance with various embodiments. The embodiment of FIG. 6 involves two WQEs in the sender work queue. The two WQEs can be adjacent to each other in the work queue, meaning one WQE is right before the other WQE in the work queue. In FIG. 6, the NIC 120A is the sender and the NIC 120B is the receiver.

The NIC 120B initiates a RDMA write operation to notify the NIC 120A with an address packeting that includes a buffer address and a remote PI. In some embodiments, the buffer address is the address of the data buffer 130B. In some embodiments, the buffer address includes the address of the data buffer 130B and the address of the data buffer 130A. The NIC 120A acknowledges the receipt of the buffer address and remote PI by sending an acknowledgement to the NIC 120B. The local PI is maintained by the NIC 120A to track the index of the slot where a new WQE can be placed. The remote PI is maintained by the NIC 120B to track occupancy of the work queue and avoid overflowing of the work queue. The PI is 0, which indicates that the new WQE can be placed in the first slot of the work queue. In some embodiments, the remote PI can also be used by the NIC 120A to track whether a WQE has a valid remote address that was provided by 120B. Accordingly, the NIC 120A places a WQE with the buffer address in the first slot. In the embodiment of FIG. 6, the WQE is the first WQE. Also, the CI of the work queue is 0, indicating the first WQE is the WQE to be completed by the NIC 120 next.

To complete the first WQE, the NIC 120A initiates a RDMA write operation to send a data packet including data from the data buffer 130A to the NIC 120B, and the NIC 120B then writes the data into the data buffer 130B. Different from the embodiment of FIG. 5 where the NIC 120B acknowledges the receipt of the data with the NIC 120A, the NIC 120B in FIG. 6 does not provide any acknowledgement on the data packet to the NIC 120A. Rather, the NIC 120B initiates another RDMA write operation. In this RDMA write operation, the NIC 120B provides the NIC 120A with a new address packet that includes a new buffer address and a new remote PI having a value of 1. The new buffer address may be the same as the one in the previous RDMA write operation of the NIC 120B. The new PI indicates that the new WQE (i.e., the second WQE) can be placed in the slot having an index of 1. As an acknowledgment was not sent by 120B on the data packet, the NIC 120A cannot confirm that the first WQE is completed and therefore, the NIC 120A does not update the CI. As shown in FIG. 6, the CI remains 0. The NIC 120A sends an acknowledgment on the new address packet to the NIC 120B. The NIC 120A also places the second WQE including the new buffer address to the second slot of the work queue and sends another data packet to the NIC 120B through another RDMA write operation. This time, the NIC 120B provides an acknowledgement to the NIC 120A. The NIC 120A takes the acknowledgement as an acknowledgement on both data packets. The NIC 120A updates the CI from 0 to 2 and can remove both the first and the second WQEs from the queue. FIG. 6 also shows that the NIC 120A sends the CI to the NIC 120B through another RDMA write operation. In the embodiment of FIG. 6, the NIC 120A sends the CI as an explicit packet. In other embodiments, the CI can be piggybacked on the next data packet sent from the NIC 120A to the NIC 120B.

Figure 7:
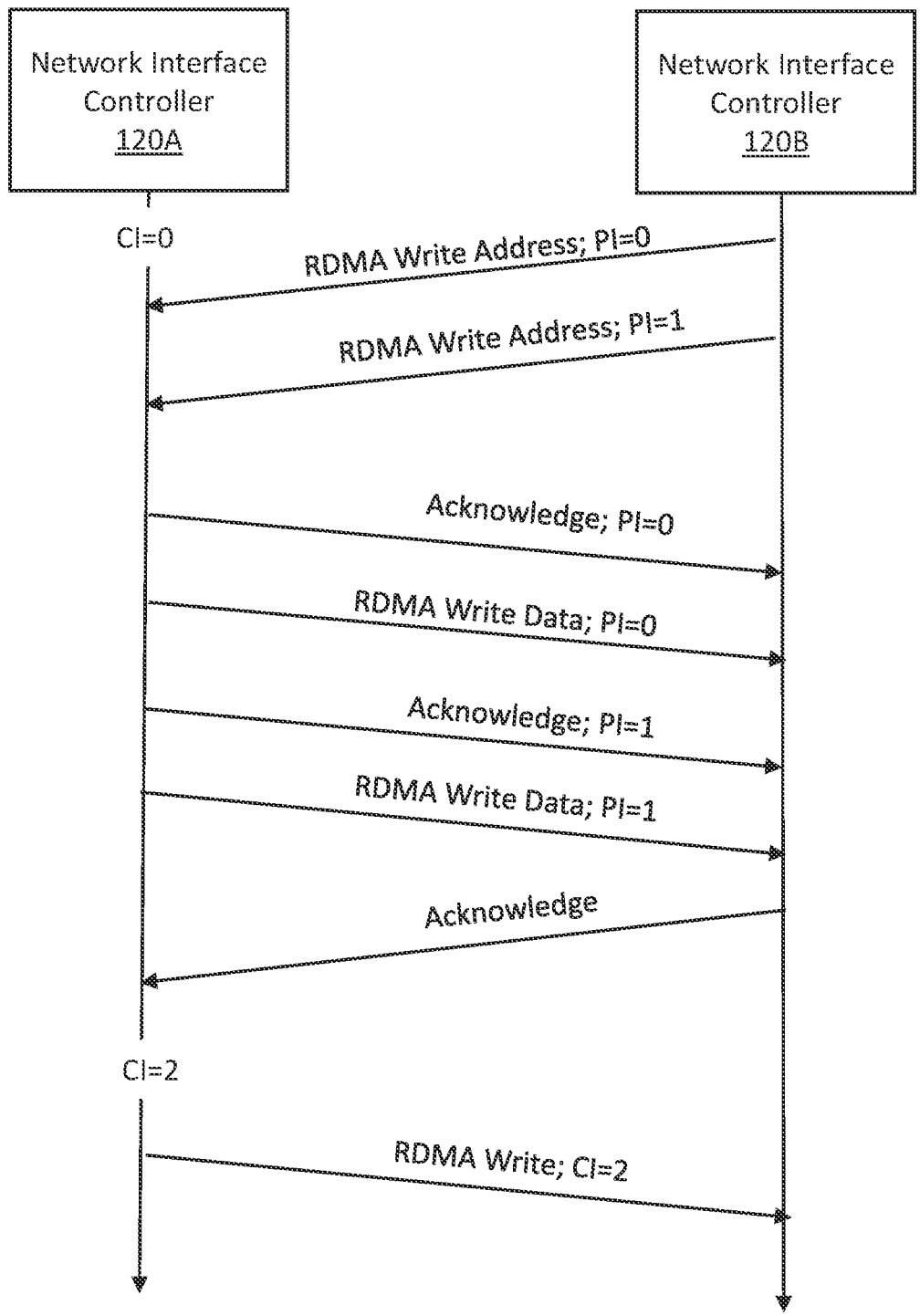
FIG. 7 illustrates yet another example rendezvous flow with RDMA write exchange, in accordance with various embodiments.

FIG. 7 illustrates yet another example rendezvous flow with RDMA write exchange, in accordance with various embodiments. Similar to the embodiment of FIG. 6, the NIC 120B in FIG. 7 initiates two RDMA write operations, which trigger two WQEs in the sender work queue. The two WQEs can be adjacent to each other in the work queue. Different from the embodiment of FIG. 6, the NIC 120B in FIG. 7 initiates the second RDMA write operation before the first WQE is processed by the NIC 120A.

Each RDMA write operation transmits a RDMA write packet that includes a buffer address and a PI. The first PI is 0 and the second PI is 1. The two buffer addresses may be the same. Then the NIC 120A acknowledges the receipt of the buffer addresses and the PIs. In the embodiment of FIG. 7, the NIC 120A sends two separate acknowledgements to the NIC 120B, one for each RDMA write packet. In other embodiments, the NIC 120A may provide one acknowledgement for receiving both RDMA write packets. The NIC 120A may update the work queue buffer 140A with the buffer address and the PIs. For instance, the NIC 120A inserts the buffer address into the first WQE in the work queue buffer 140A based on the first PI and inserts the buffer address into the second WQE based on the second PI. The NIC 120A sets the value of the CI of the work queue to 0, since the NIC 120A does not receive any acknowledgement for both WQEs. The NIC 120A cannot remove these WQEs from the work queue. FIG. 7 also shows that the NIC 120B acknowledges the two data packets eventually. After the data packets are acknowledged by the NIC 120B, the NIC 120A updates the value of the CI to 2. The NIC 120A can then remove the two tasks from the work queue. FIG. 7 further shows that the NIC 120A sends the CI to the NIC 120B through another RDMA write operation. In the embodiment of FIG. 7, the NIC 120A sends the CI as an explicit packet. In other embodiments, the CI can be piggybacked on the next data packet sent from the NIC 120A to the NIC 120B.

Figure 8:
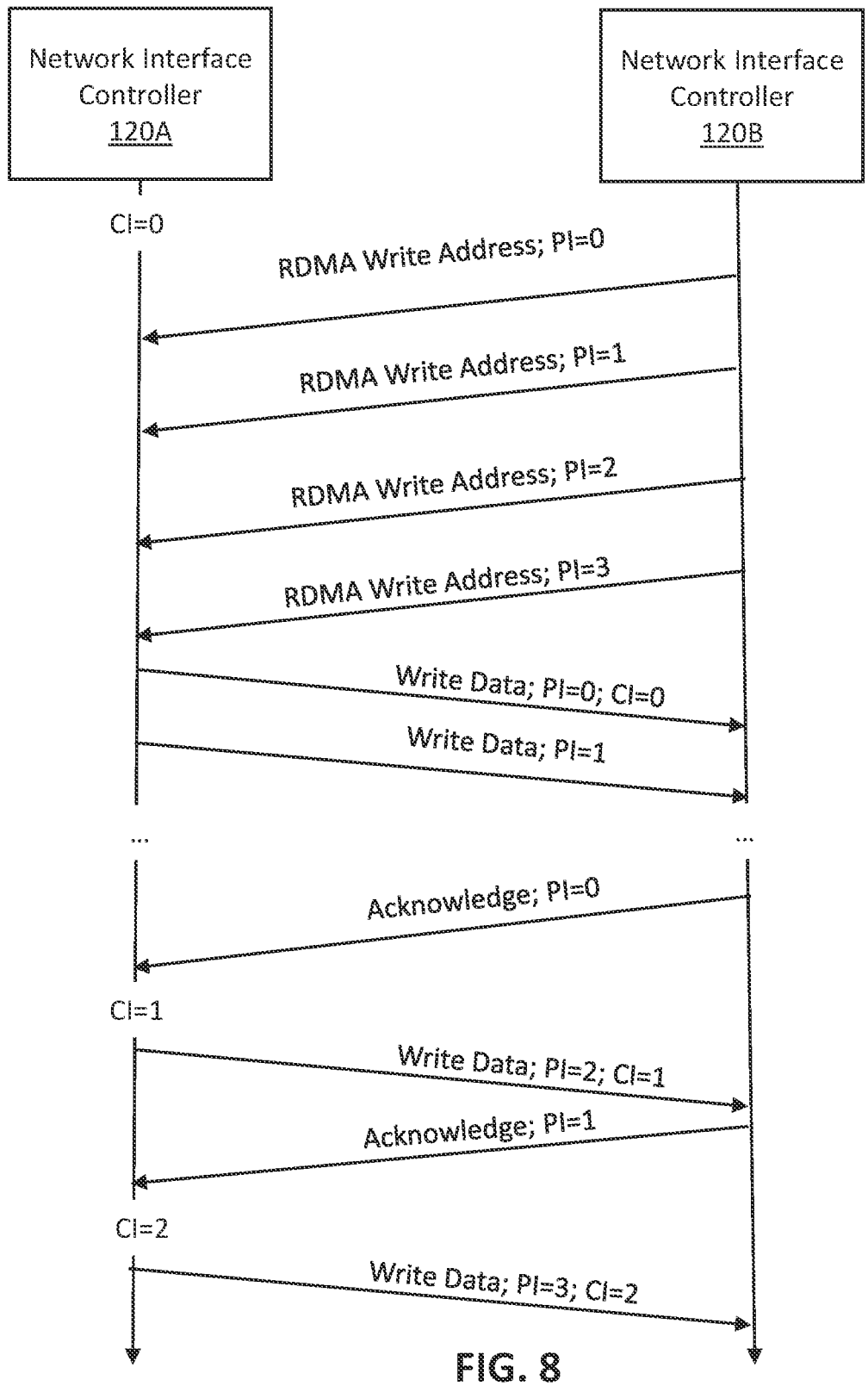
FIG. 8 illustrates an example rendezvous flow with RDMA write exchange through a work queue buffer including fences, in accordance with various embodiments.

FIG. 8 illustrates an example rendezvous flow with RDMA write exchange through a work queue buffer including fences, in accordance with various embodiments. The work queue buffer can be the work queue buffer 400 shown in FIG. 4. In the embodiment of FIG. 8, the NIC 120B initiates four RDMA write operations in a row. In other embodiments, the NIC 120B may initiate a different number of RDMA write operations.

The four RDMA write operations in FIG. 8 triggers four WQEs. Each RDMA write operation transmits a RDMA write packet that includes a buffer address and a remote PI. The four buffer addresses may be the same. However, the remote PIs are different. The NIC 120B increments the remote PI by 1 every time after it sends out a RDMA write packet. As shown in FIG. 8, the remote PI in the first RDMA write packet is 0. After the NIC 120B sends out the first RDMA write packet, it increments the remote PI from 0 to 1 so that the remote PI in the second RDMA write packet is 1. Similarly, the remote PI in the third RDMA write packet is 2 and the remote PI in the fourth RDMA write packet is 3. After the NIC 120B sends out the fourth RDMA write packet, it increments the remote PI to 4.

Even though not shown in FIG. 8, the NIC 120A can acknowledge the receipt of the RDMA write packets. Also, the NIC 120A can update the work queue buffer 400 with the RDMA write packets. For example, the NIC 120A inserts the first buffer address (i.e., the buffer address in the first RDMA write packet) into the section 410A based on the first remote PI (i.e., the remote PI in the first RDMA write packet), inserts the second buffer address into the section 410B based on the second PI, inserts the third buffer address into the section 410C based on the third PI, and inserts the fourth buffer address into the section 410D based on the fourth PI. In this example, each section 410 is a slot and stores one WQE at a time. As shown in FIG. 8, the NIC 120A processes the first and second WQEs by sending data packets to the NIC 120B. The first data packet includes the local CI, which is 0, so that the NIC 120B can update the remote CI accordingly.

The NIC 120B uses the remote PI and remote CI to track occupancy of the work queue. For instance, the NIC 120B calculates the work queue occupancy by subtracting the remote CI from the remote PI. As the remote PI is 4 and the remote CI is 0, the current occupancy of the work queue is 4. The NIC 120B also compares the current occupancy of the work queue with the size of the work queue. In this example, the work queue includes 4 slots, so the size of the work queue is 4. The size of the work queue equals the number of slots in the work queue. The NIC 120B determines that the current occupancy of the work queue exceeds the size of the work queue as the occupancy is equal to the work queue size. Based on such a determination, the NIC 120B will stop sending any new RDMA write packets to the NIC 120A.

The sections 410 are fenced. The NIC 120A cannot initiate a RDMA write operation for the third WQE in the section 410C given the presence of the fence 420A. As the fence 420A blocks the section 410C, the NIC 120A cannot execute the WQE stored in the section 410C until acknowledgement for the WQE in the section 410A is received. Similarly, as the fence 420B blocks the section 410D, the NIC 120A cannot execute the WQE stored in the section 410D until acknowledgement for the second WQE (remote PI=1) is received.

FIG. 8 further shows that the NIC 120A eventually receives the acknowledgement for the first WQE (remote PI=0). The NIC 120A then updates the local CI from 0 to 1 based on the acknowledgement and can further remove the first WQE from the section 410A. The NIC 120A also initiates a RDMA write operation for the third WQE (PI=2) after it receives the acknowledgement. The data packet for the third WQE includes the updated CI so that the NIC 120B can re-calculate the work queue occupancy. The work queue occupancy becomes 3 as the CI is increased to 1, so the NIC 120B may send a new address packet (not shown in FIG. 8) to the NIC 120A. If the NIC 120B sends a new address packet, the NIC 120A can place a new WQE (the fifth WQE) with the new address packet in the section 410A from which the first WQE has been removed. Similarly, after the NIC 120A is notified of the acknowledgement for the second WQE, the NIC 120A updates the CI to 2 and initiates a RDMA write operation for the fourth WQE (PI=3).

In the embodiment of FIG. 8, the local CI is piggybacked on the data packets sent by the NIC 120A to the NIC 120B. In other words, the NIC 120B does not receive updated local CIs until the NIC 120A executes RDMA operations to send the data packets to the NIC 120B. Accordingly, the NIC 120B cannot determine whether the occupancy of the work queue buffer 140A has changed until the NIC 120B receives the data packets. The fences 420 prevent a deadlock by making sure that all sections 410 but the last one is acknowledged and that the latest CI is sent to the NIC 120B.

Without the fences 420, the NIC 120A would process the third WQE even though it does not receive acknowledgement for the first WQE and does not update the local CI. The data packet for the third WQE would not include the local CI and the remote CI maintained by the NIC 120B would not be updated. Consequently, the occupancy of the work queue calculated by the NIC 120B would not be changed. The NIC 120B would still determine that the work queue is fully occupied and would continue to stop sending new RDMA write packets to the NIC 120A. Hence, without the fences 420, this would result in a deadlock.

Example AI System

Figure 9:
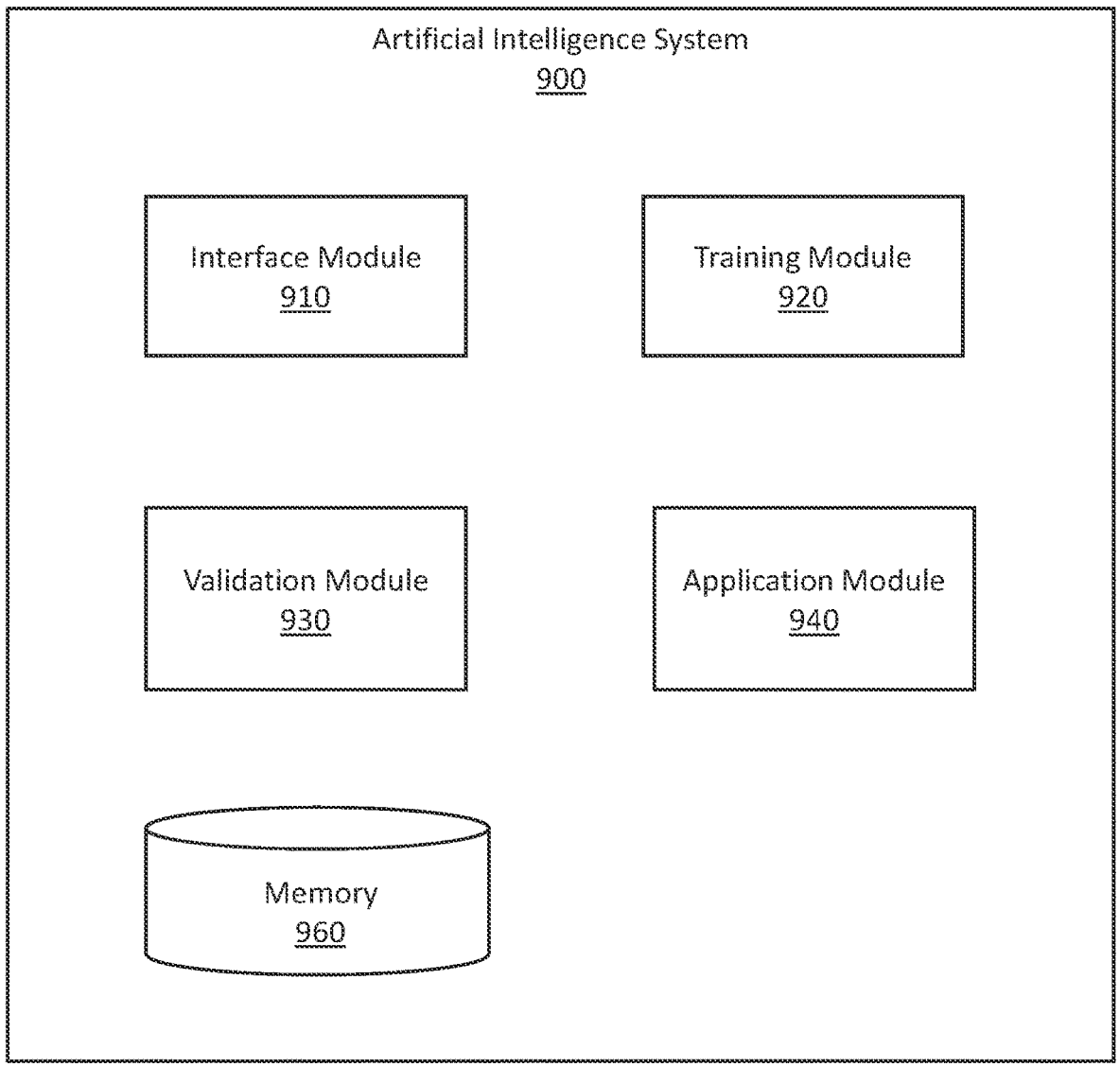
FIG. 9 is a block diagram of an example artificial intelligence (AI) system, in accordance with various embodiments.

FIG. 9 is a block diagram of an example AI system 900, in accordance with various embodiments. The AI system 900 trains ANNs for various tasks, such as image classification, learning relationships between biological cells (e.g., DNA, proteins, etc.), control behaviors for devices (e.g., robots, machines, etc.), and so on. The AI system 900 includes an interface module 910, a training module 920, a validation module 930, an inference module 940, and a memory 950. In other embodiments, alternative configurations, different or additional components may be included in the AI system 900. Further, functionality attributed to a component of the AI system 900 may be accomplished by a different component included in the AI system 900 or a different system. The AI system 900 or a component of the AI system 900 (e.g., the training module 920 or inference module 940) may include the computing system 90 in FIG. 1.

The interface module 910 facilitates communications of the AI system 900 with other systems. For example, the interface module 910 establishes communications between the AI system 900 with an external database to receive data that can be used to train ANNs or input into ANNs to perform tasks. As another example, the interface module 910 supports the AI system 900 to distribute ANNs to other systems, e.g., computing devices configured to apply ANNs to perform tasks.

The training module 920 trains ANNs by using a training dataset. The training module 920 forms the training dataset. In an embodiment where the training module 920 trains an ANN to recognize objects in images, the training dataset includes training images and training labels. The training labels describe ground truth classifications of objects in the training images. In some embodiments, each label in the training dataset corresponds to an object in a training image. In some embodiments, a part of the training dataset may be used to initially train the ANN, and the rest of the training dataset may be held back as a validation subset used by the validation module 930 to validate performance of a trained ANN. The portion of the training dataset not including the tuning subset and the validation subset may be used to train the ANN.

The training module 920 also determines hyperparameters for training the ANN. Hyperparameters are variables specifying the ANN training process. Hyperparameters are different from parameters inside the ANN (e.g., weights of filters). In some embodiments, hyperparameters include variables determining the architecture of the ANN, such as number of hidden layers, etc. Hyperparameters also include variables which determine how the ANN is trained, such as batch size, number of epochs, etc. A batch size defines the number of training samples to work through before updating the parameters of the ANN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the DL algorithm works through the entire training dataset. One epoch means that each training sample in the training dataset has had an opportunity to update the parameters inside the ANN. An epoch may include one or more batches. The number of epochs may be 9, 90, 500, 900, or even larger.

The training module 920 defines the architecture of the ANN, e.g., based on some of the hyperparameters. The architecture of the ANN includes an input layer, an output layer, and a plurality of hidden layers. The input layer of an ANN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the ANN abstract the input image to a feature map that is represented by a tensor specifying the feature map height, the feature map width, and the feature map channels (e.g., red, green, blue images include three channels). A pooling layer is used to reduce the spatial volume of input image after convolution. It is used between two convolution layers. A fully connected layer involves weights, biases, and neurons. It connects neurons in one layer to neurons in another layer. It is used to classify images between different category by training.

In the process of defining the architecture of the ANN, the training module 920 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 920 defines the architecture of the ANN, the training module 920 inputs a training dataset into the ANN. The training dataset includes a plurality of training samples. An example of a training sample includes an object in an image and a ground truth label of the object. The training module 920 modifies the parameters inside the ANN ("internal parameters of the ANN") to minimize the error between labels of the training objects that are generated by the ANN and the ground truth labels of the objects. The internal parameters include weights of filters in the convolutional layers of the ANN and tunable parameters of the FALU activation. In some embodiments, the training module 920 uses a cost function to minimize the error.

The training module 920 may train the ANN for a predetermined number of epochs. The number of epochs is a hyperparameter that defines the number of times that the DL algorithm will work through the entire training dataset. One epoch means that each sample in the training dataset has had an opportunity to update internal parameters of the ANN. After the training module 920 finishes the predetermined number of epochs, the training module 920 may stop updating the parameters in the ANN. The ANN having the updated parameters is referred to as a trained ANN.

The validation module 930 verifies accuracy of trained ANNs. In some embodiments, the validation module 930 inputs samples in a validation dataset into a trained ANN and uses the outputs of the ANN to determine the model accuracy. In some embodiments, a validation dataset may be formed of some or all the samples in the training dataset. Additionally or alternatively, the validation dataset includes additional samples, other than those in the training sets. In some embodiments, the validation module 930 determines may determine an accuracy score measuring the precision, recall, or a combination of precision and recall of the ANN. The validation module 930 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 930 may compare the accuracy score with a threshold score. In an example where the validation module 930 determines that the accuracy score of the augmented model is lower than the threshold score, the validation module 930 instructs the training module 920 to re-train the ANN. In one embodiment, the training module 920 may iteratively re-train the ANN until the occurrence of a stopping condition, such as the accuracy measurement indication that the ANN may be sufficiently accurate, or a number of training rounds having taken place.

The inference module 940 applies the trained or validated ANN to perform tasks. For instance, the inference module 940 inputs images into the ANN. The ANN outputs classifications of objects in the images. As an example, the ANN may be provisioned in a security setting to detect malicious or hazardous objects in images captured by security cameras. As another example, the ANN may be provisioned to detect objects (e.g., road signs, hazards, humans, pets, etc.) in images captured by cameras of an autonomous vehicle. The input to the ANN may be formatted according to a predefined input structure mirroring the way that the training dataset was provided to the ANN. The ANN may generate an output structure which may be, for example, a classification of the image, a listing of detected objects, a boundary of detected objects, or the like. In some embodiments, the inference module 940 distributes the ANN to other systems, e.g., computing devices in communication with the AI system 900, for the other systems to apply the ANN to perform the tasks.

The memory 950 stores data received, generated, used, or otherwise associated with the AI system 900. For example, the memory 950 stores the datasets used by the training module 920 and validation module 930. The memory 950 may also store data generated by the training module 920 and validation module 930, such as the hyperparameters for training ANNs, internal parameters of trained ANNs (e.g., values of tunable parameters of FALUs), etc. In the embodiment of FIG. 9, the memory 950 is a component of the AI system 900. In other embodiments, the memory 950 may be external to the AI system 900 and communicate with the AI system 900 through a network.

Example Computing System

Figure 10:
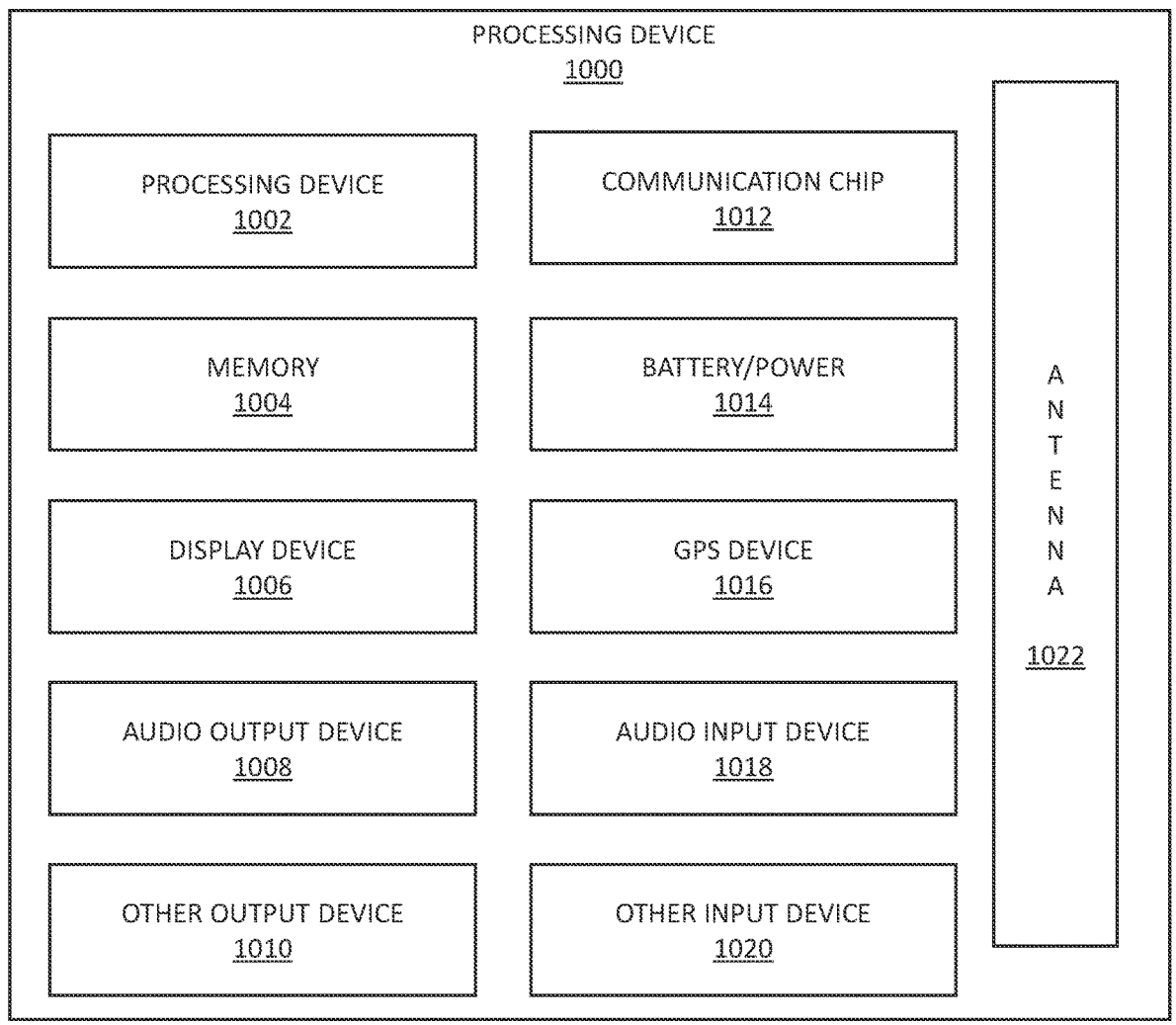
FIG. 10 is a block diagram of an example computing system, in accordance with various embodiments.

FIG. 10 is a block diagram of an example computing system 1000, in accordance with various embodiments. The computing system 1000 may be an embodiment of the computing system 100 in FIG. 1, or an embodiment of a part of the computing system 100. In some embodiments, the computing system 1000 can be used as the AI system 900 in FIG. 9. A number of components are illustrated in FIG. 10 as included in the computing system 1000, but any one or more of these components may be omitted or duplicated, as suitable for the application. In some embodiments, some or all of the components included in the computing system 1000 may be attached to one or more motherboards. In some embodiments, some or all of these components are fabricated onto a single system on a chip (SoC) die. Additionally, in various embodiments, the computing system 1000 may not include one or more of the components illustrated in FIG. 10, but the computing system 1000 may include interface circuitry for coupling to the one or more components. For example, the computing system 1000 may not include a display device 1006, but may include display device interface circuitry (e.g., a connector and driver circuitry) to which a display device 1006 may be coupled. In another set of examples, the computing system 1000 may not include an audio input device 1018 or an audio output device 1008, but may include audio input or output device interface circuitry (e.g., connectors and supporting circuitry) to which an audio input device 1018 or audio output device 1008 may be coupled.

The computing system 1000 may include a processing device 1002 (e.g., one or more processing devices). An embodiment of the processing device 1002 is a processing device 110 in FIG. 1. The computing system 1000 may include a memory 1004, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1004 may include memory that shares a die with the processing device 110. In some embodiments, the memory 1004 includes one or more non-transitory computer-readable media storing instructions executable to perform operations for accelerating sparse matrix computation in deep learning. The instructions stored in the one or more non-transitory computer-readable media may be executed by the processing device 110.

In some embodiments, the computing system 1000 may include a communication chip 1012 (e.g., one or more communication chips). For example, the communication chip 1012 may be configured for managing wireless communications for the transfer of data to and from the computing system 1000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1012 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1012 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1012 may operate in accordance with other wireless protocols in other embodiments. The computing system 1000 may include an antenna 1022 to facilitate wireless communications and/or to receive other wireless communications (such as AM or FM radio transmissions).

In some embodiments, the communication chip 1012 may manage wired communications, such as electrical, optical, or any other suitable communication protocols (e.g., the Ethernet). As noted above, the communication chip 1012 may include multiple communication chips. For instance, a first communication chip 1012 may be dedicated to shorter-range wireless communications such as Wi-Fi or Bluetooth, and a second communication chip 1012 may be dedicated to longer-range wireless communications such as global positioning system (GPS), EDGE, GPRS, CDMA, WiMAX, LTE, EV-DO, or others. In some embodiments, a first communication chip 1012 may be dedicated to wireless communications, and a second communication chip 1012 may be dedicated to wired communications.

The computing system 1000 may include battery/power circuitry 1014. The battery/power circuitry 1014 may include one or more energy storage devices (e.g., batteries or capacitors) and/or circuitry for coupling components of the computing system 1000 to an energy source separate from the computing system 1000 (e.g., AC line power).

The computing system 1000 may include a display device 1006 (or corresponding interface circuitry, as discussed above). The display device 1006 may include any visual indicators, such as a heads-up display, a computer monitor, a projector, a touchscreen display, a liquid crystal display (LCD), a light-emitting diode display, or a flat panel display, for example.

The computing system 1000 may include an audio output device 1008 (or corresponding interface circuitry, as discussed above). The audio output device 1008 may include any device that generates an audible indicator, such as speakers, headsets, or earbuds, for example.

The computing system 1000 may include an audio input device 1018 (or corresponding interface circuitry, as discussed above). The audio input device 1018 may include any device that generates a signal representative of a sound, such as microphones, microphone arrays, or digital instruments (e.g., instruments having a musical instrument digital interface (MIDI) output).

The computing system 1000 may include a GPS device 1016 (or corresponding interface circuitry, as discussed above). The GPS device 1016 may be in communication with a satellite-based system and may receive a location of the computing system 1000, as known in the art.

The computing system 1000 may include an other output device 1010 (or corresponding interface circuitry, as discussed above). Examples of the other output device 1010 may include an audio codec, a video codec, a printer, a wired or wireless transmitter for providing information to other devices, or an additional storage device.

The computing system 1000 may include an other input device 1020 (or corresponding interface circuitry, as discussed above). Examples of the other input device 1020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (register fileID) reader.

The computing system 1000 may have any desired form factor, such as a handheld or mobile computing system (e.g., a cell phone, a smart phone, a mobile internet device, a music player, a tablet computer, a laptop computer, a netbook computer, an ultrabook computer, a PDA, an ultramobile personal computer, etc.), a desktop computing system, a server or other networked computing component, a printer, a scanner, a monitor, a set-top box, an entertainment control unit, a vehicle control unit, a digital camera, a digital video recorder, or a wearable computing system. In some embodiments, the computing system 1000 may be any other electronic device that processes data.

Example Methods of Data Transfer Using RDMA Write Exchange

Figure 11:
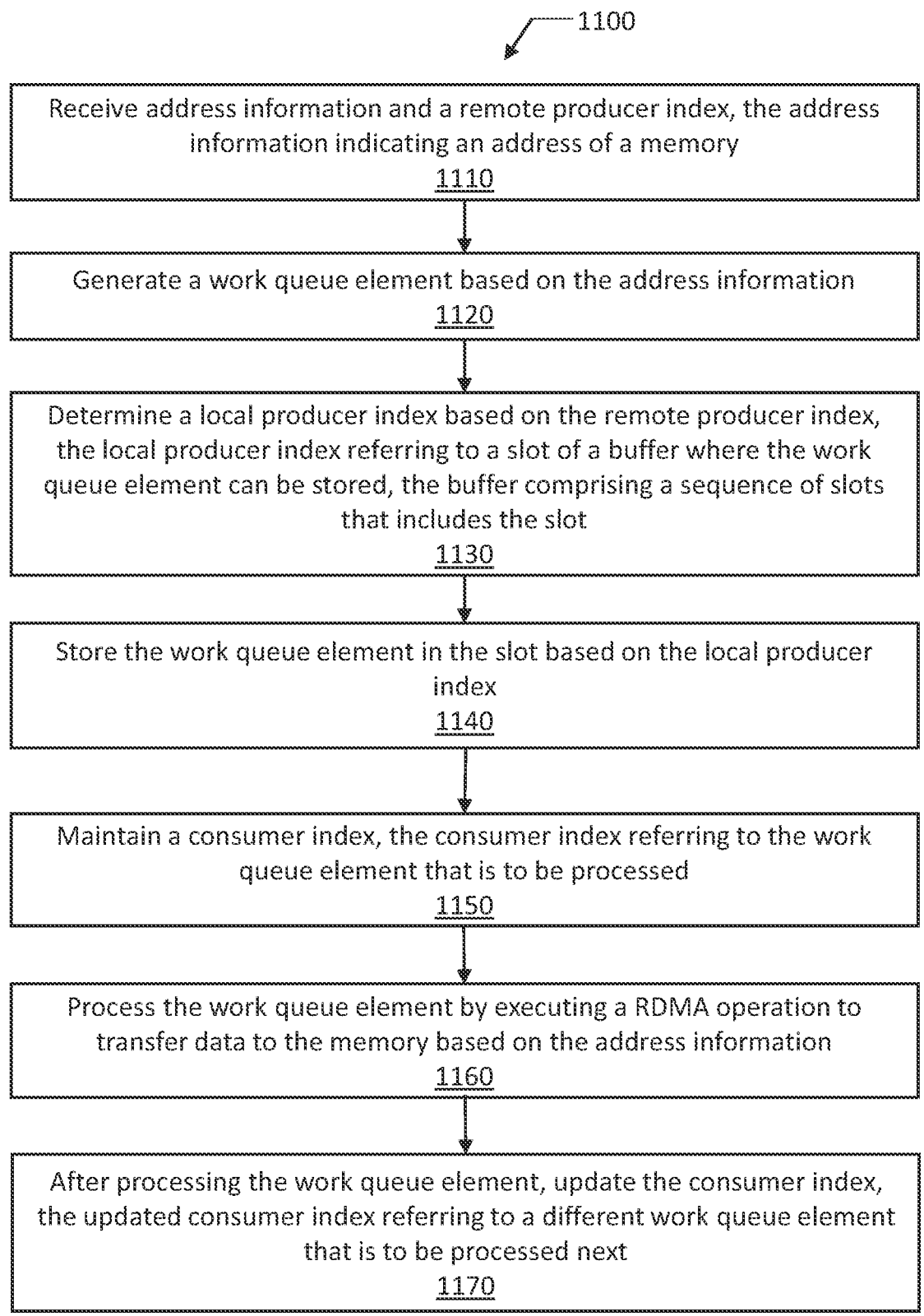
FIG. 11 is a flowchart showing an example method of data transfer using RDMA write exchange, in accordance with various embodiments.

FIG. 11 is a flowchart showing an example method 1100 of data transfer using RDMA write exchange, in accordance with various embodiments. The method 1100 may be performed by the NIC 120A described above in conjunction with FIG. 1. Although the method 1100 is described with reference to the flowchart illustrated in FIG. 11, many other methods of data transfer using RDMA write exchange may alternatively be used. For example, the order of execution of the steps in FIG. 11 may be changed. As another example, some of the steps may be changed, eliminated, or combined.

The NIC 120A receives 1110 address information and a remote PI. The address information indicates an address of a memory, e.g., the data buffer 130B. The memory can be at the receiver side and store the data to be received. In some embodiments, the address information also indicates an address of another memory, e.g., the data buffer 130A. The other memory can be at the sender side and store the data to be sent out by the NIC 120A.

The NIC 120A generates 1120 a WQE based on the address information. The WQE can be stored in a buffer, e.g., the work queue buffer 140A. The buffer includes a sequence of slots. Each slot can store a WQE at a time. The NIC 120A determines 1130 a local PI based on the remote PI. For example, the NIC 120A updates the local PI to match the remote PI. Additionally, or alternatively, the NIC 120A increments the local PI by 1 after it receives the remote PI. The local PI refers to a slot where the WQE can be stored. The NIC 120A stores 1140 the WQE in the slot based on the local PI. In some embodiments, the WQE includes two parts. One part is associated with the address of the receiver memory (e.g., the address of the data buffer 130B), which is written into the part of the WQE after the NIC 120A receives the address information and the remote PI. The other part of the WQE is associated with the address of the sender memory (e.g., the address of the data buffer 130A). After the address of the sender memory is written into the other part, the local PI is incremented. Then the WQE can be executed by the NIC 120A.

The NIC 120A also maintains 1150 a CI. The CI refers to the WQE that is to be processed. The NIC 120A processes 1160 the WQE by executing a RDMA operation to transfer data to the memory based on the address information. For instance, the NIC 120 writes data in the data buffer 130A to the data buffer 130B by using the RDMA operation. In some embodiments, the slot is fenced. The NIC 120A does not process the WQE until after it receives an acknowledgement for a different WQE stored in a different slot in the buffer. The acknowledgement indicates that different data, which is associated with the different WQE, has been transferred to the memory. The sequence may include one or more slots between the slot and the different slot.

After processing the WQE, the NIC 120A updates 1170 the CI, e.g., by incrementing the CI by 1. In some embodiments, the NIC 120A receives an acknowledgment, e.g., from the NIC 120B. The acknowledgement indicates that the data has been received by the NIC 120B. The NIC 120A updates the CI in response to receiving the acknowledgement. The NIC 120A may remove the WQE from the slot after it executes the RDMA operation, e.g., after it updates the CI, so that the slot can become available to store other WQEs.

The updated CI refers to an additional WQE that is stored in an additional slot of the buffer and is to be processed next by the NIC 120A. The additional slot may be adjacently subsequent to the slot in the sequence. The additional WQE can be for transferring new data. In some embodiments, the NIC 120A processes the additional WQE by executing a new RDMA operation to send the new data to the NIC 120B. The NIC 120A can also send the updated CI to the NIC 120B for the NIC 120B. The NIC 120A may generate a packet that includes both the new data and the updated CI and transfer the packet through the new RDMA operation. Alternatively, the NIC 120A can send the new data and the updated CI separately, e.g., through separate RDMA operations.

In some embodiments, the NIC 120A can execute the additional WQE without receiving the acknowledgment or updating the CI, e.g., in embodiments where the work queue does not include fences.

Figure 12:
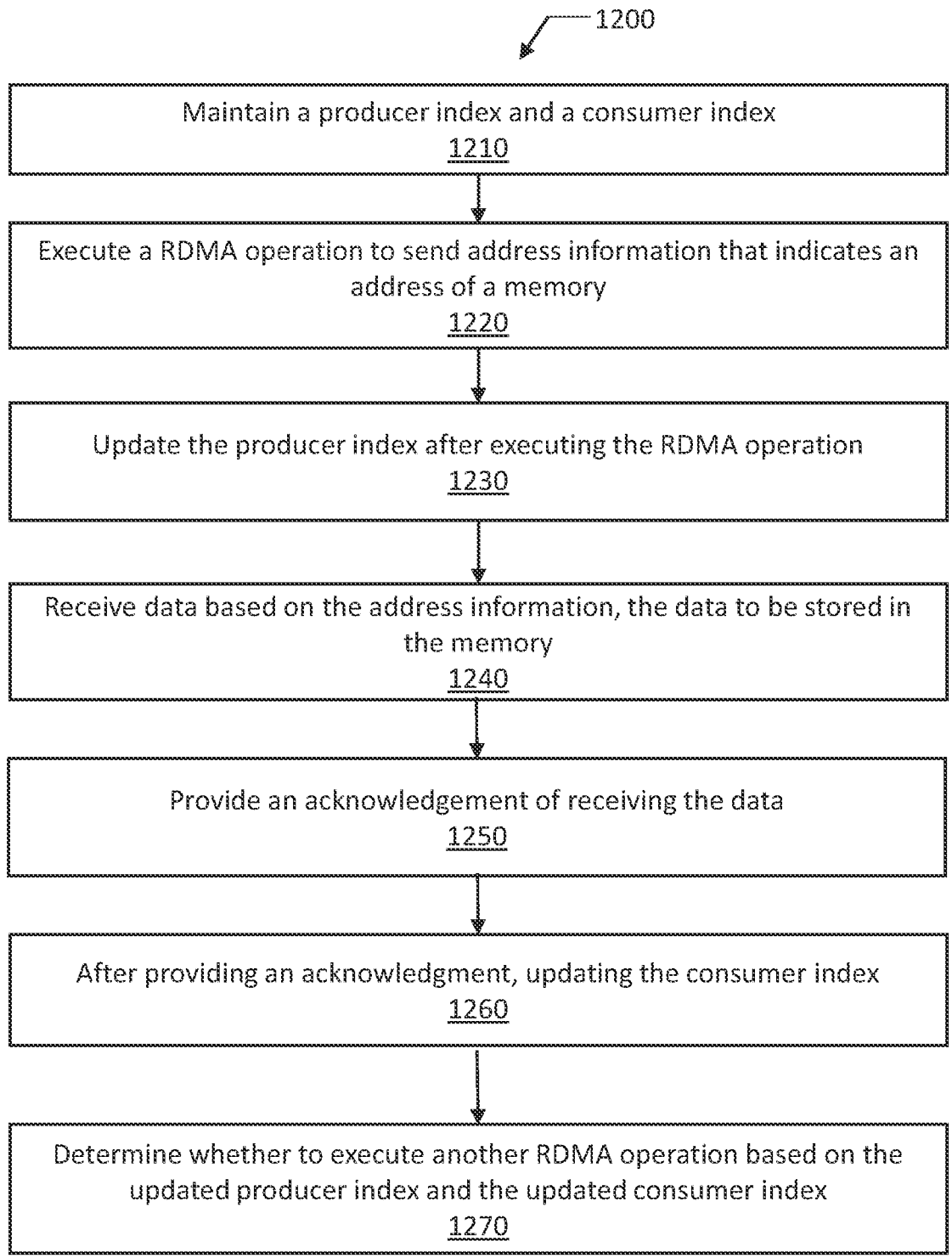
FIG. 12 is a flowchart showing another example method of data transfer using RDMA write exchange, in accordance with various embodiments.

FIG. 12 is a flowchart showing another example method 1200 of data transfer using RDMA write exchange, in accordance with various embodiments. The method 1200 may be performed by the NIC 120B described above in conjunction with FIG. 1. Although the method 1200 is described with reference to the flowchart illustrated in FIG. 12, many other methods of data transfer using RDMA write exchange may alternatively be used. For example, the order of execution of the steps in FIG. 12 may be changed. As another example, some of the steps may be changed, eliminated, or combined.

The NIC 120B maintains 1210 a PI and CI. The NIC 120B can use the PI and CI to avoid overflowing the work queue buffer 140A. The NIC 120B executes 1220 a RDMA operation to send address information that indicates an address of a memory. The memory is associated with the NIC 120B and is a receive memory, e.g., the data buffer 130B. In some embodiments, the address information also includes an address of the send memory, e.g., the data buffer 130A. The RDMA operations initiates a data transfer task, which can be processed by using a rendezvous flow of RDMA write exchange between the NIC 120B and the NIC 120A.

The NIC 120B updates 1230 the PI after executing the RDMA operation. The NIC 120B can calculate the occupancy of a buffer (e.g., the work queue buffer 140A) based on the updated PI and the CI. The buffer stores WQEs, a WQE corresponds to a data transfer task and can include information needed for the data transfer task, e.g., the address information. The NIC 120B may determine the occupancy of the buffer by subtracting the CI from the updated PI.

The NIC 120B further compares the occupancy with a size of the work queue buffer 140A. In response to determining that the occupancy is smaller than the size, the NIC 120B may execute a new RDMA operation to initiate another data transfer task. In response to determining that the occupancy is equal to or larger than the size, the NIC 120B will not execute new RDMA operations until the occupancy of the buffer changes.

The NIC 120B receives 1240 data based on the address information. The received data will be stored in the memory. The NIC 120B provides 1250 an acknowledgement of receiving the data and updates 1260 the CI. In some embodiments, before the NIC 120B updates the CI, the CI was provided by the NIC 120A in a data packet sent by the NIC 120A. The data packet can include the data and the CI. In some embodiments, the NIC 120B provides 1250 the acknowledgement to the NIC 120A. The NIC 120A, after receiving the acknowledgement, updates a CI that is maintained by the NIC 120A. The NIC 120A provides the updated CI to the NIC 120B and the NIC 120B can update its CI accordingly.

The NIC 120B determines 1270 whether to execute another RDMA operation based on the updated PI and the updated CI. Similar to the method described above, the NIC 120B can calculate the occupancy of the buffer by subtracting the updated CI from the updated PI and compare the occupancy with the size of the buffer. The NIC 120B determines whether to executed new RDMA operations based on the comparison. In some embodiments, the NIC 120B checks the occupancy of the buffer every time the PI or the CI is updated.

Select Examples

The following paragraphs provide various examples of the embodiments disclosed herein.

Example 1 provides an apparatus, including a buffer including a sequence of slots, each respective slot configured to store a WQE for sending data stored in a send buffer to a receive buffer, the buffer associated with a PI that refers to a slot where a new WQE can be placed in the buffer; and a first network interface controller coupled to the buffer and configured to receive address information indicating an address of the receive buffer from a second network interface controller coupled to the receive buffer, store the new WQE in the slot of the buffer based on the PI, the new WQE including the address information, process the new WQE by executing a RDMA operation to write the data stored in the send buffer to the receive buffer based on the address information, and update a CI associated with the buffer, the updated CI referring to a next WQE to be processed by the first network interface controller.

Example 2 provides the apparatus of example 1, where the first network interface controller is configured to receive the address information by receiving a packet that includes the address information and a remote PI, the remote PI is maintained by the second network interface controller, and the first network interface controller is further configured to determine a value of the PI based on the remote PI.

Example 3 provides the apparatus of example 1, where the address information further indicates an address of the send buffer.

Example 4 provides the apparatus of example 1, where the first network interface controller is further configured to update the PI after receiving the address information.

Example 5 provides the apparatus of example 4, where executing the RDMA operation includes sending a data packet to the second network interface controller, and the data packet includes the data stored in the send buffer and the CI.

Example 6 provides the apparatus of example 1, where the first network interface controller is further configured to execute another RDMA operation to send the CI to the second network interface controller.

Example 7 provides the apparatus of example 1, where the buffer further includes a fence associated with a first slot in the sequence, the fence is configured to prevent the first network interface controller from processing a WQE stored in the first slot before the first network interface controller receives an acknowledgment from the second network interface controller, and the acknowledgement is associated with a different WQE stored in a second slot in the sequence.

Example 8 provides the apparatus of example 1, where there is at least one slot between the first slot and the second slot in the sequence.

Example 9 provides the apparatus of example 1, where the first network interface controller is configured to update the CI associated with the buffer after receiving an acknowledgment from the second network interface controller, and the acknowledgment indicates that the second network interface controller has received the data.

Example 10 provides the apparatus of example 1, where the first network interface controller is further configured to remove the new WQE from the slot after updating the CI.

Example 11 provides an apparatus, including a receive buffer configured to store data received from a first network interface controller; and a second network interface controller coupled to the receive buffer and configured to maintain a first index and a second index; executing a first RDMA operation to send address information to the first network interface controller, the address information indicating an address of the receive buffer, update the first index after executing the first RDMA operation, receive data from the first network interface controller based on the address information, and determine whether to execute a second RDMA operation based on the updated first index and the second index.

Example 12 provides the apparatus of example 11, where the second network interface controller is configured to determine whether to execute the second RDMA operation by determining an occupancy of a buffer associated with the first network interface controller based on the updated first index and the second index; determining whether a size of the buffer is greater than the occupancy of the buffer; and in response to determining that size of the buffer is greater than the occupancy of the buffer, determining to execute the second RDMA operation.

Example 13 provides the apparatus of example 12, where determining the occupancy of the buffer includes subtracting the second index from the updated first index.

Example 14 provides the apparatus of example 11, where the second network interface controller is configured to execute the first RDMA operation further to send a packet to the first network interface controller, and the packet includes the address information and the first index.

Example 15 provides the apparatus of example 11, where the second network interface controller is further configured to receive an index from the first network interface controller; update the second index based on the index, where the second network interface controller is configured to determine whether to execute the second RDMA operation based on the updated first index and updated second index.

Example 16 provides the apparatus of example 15, where the second network interface controller is configured to receive the data and the index in a same packet from the first network interface controller.

Example 17 provides the apparatus of example 11, where the address information further indicates an address of a send buffer associated with the first network interface controller.

Example 18 provides a method for data transfer, including receiving address information and a remote PI, the address information indicating an address of a memory; generating a WQE based on the address information; determining a local PI based on the remote PI, the local PI referring to a slot of a buffer where the WQE can be stored, the buffer including a sequence of slots that includes the slot; storing the WQE in the slot based on the local PI; maintaining a CI, the CI referring to the WQE that is to be processed; processing the WQE by executing a RDMA operation to transfer data to the memory based on the address information; and after processing the WQE, updating the CI, the updated CI referring to an additional WQE that is to be processed next.

Example 19 provides the method of example 18, where the address information further indicates an address of an additional memory, and the data is stored in the additional memory.

Example 20 provides the method of example 18, where after processing the WQE, updating the CI includes after processing the WQE, receiving an acknowledgement that the data has been received; and after receiving the acknowledgment, updating the CI.

Example 21 provides the method of example 18, where the additional WQE is stored in an additional slot of the buffer, and the additional slot is subsequent to the slot in the sequence.

Example 22 provides the method of example 18, where processing the WQE includes receiving an acknowledgement indicating that different data has been transferred to the memory, the different data associated with a different WQE stored in a different slot in the sequence; and after receiving the acknowledgment, processing the WQE.

Example 23 provides the method of example 22, where there is at least one slot in the sequence between the slot and the different slot.

Example 24 provides the method of example 18, further including after updating the CI, removing the WQE from the slot.

Example 25 provides the method of example 18, further including generating a packet, the packet including the updated CI and new data, where the additional WQE is for transferring the new data; and processing the additional WQE by executing a new RDMA operation to transfer the packet.

The above description of illustrated implementations of the disclosure is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. An apparatus, comprising:
a buffer comprising a sequence of slots, each respective slot configured to store a work queue element for sending data stored in a send buffer to a receive buffer, the buffer associated with a producer index that refers to a slot where a new work queue element can be placed in the buffer; and
a first network interface controller coupled to the buffer and configured to:
receive address information indicating an address of the receive buffer from a second network interface controller coupled to the receive buffer,
store the new work queue element in the slot of the buffer based on the producer index, the new work queue element including the address information,
process the new work queue element by executing a remote direct memory access (RDMA) operation to write the data stored in the send buffer to the receive buffer based on the address information, and
update a consumer index associated with the buffer, the updated consumer index referring to a next work queue element to be processed by the first network interface controller.

2. The apparatus of claim 1, wherein the first network interface controller is configured to receive the address information by receiving a packet that includes the address information and a remote producer index, the remote producer index is maintained by the second network interface controller, and the first network interface controller is further configured to determine a value of the producer index based on the remote producer index.

3. The apparatus of claim 1, wherein the address information further indicates an address of the send buffer.

4. The apparatus of claim 1, wherein the first network interface controller is further configured to update the producer index after receiving the address information.

5. The apparatus of claim 4, wherein executing the RDMA operation comprises sending a data packet to the second network interface controller, and the data packet includes the data stored in the send buffer and the consumer index.

6. The apparatus of claim 1, wherein the first network interface controller is further configured to execute another RDMA operation to send the consumer index to the second network interface controller.

7. The apparatus of claim 1, wherein:
the buffer further comprises a fence associated with a first slot in the sequence,
the fence is configured to prevent the first network interface controller from processing a work queue element stored in the first slot before the first network interface controller receives an acknowledgment from the second network interface controller, and
the acknowledgement is associated with a different work queue element stored in a second slot in the sequence.

8. The apparatus of claim 7, wherein there is at least one slot between the first slot and the second slot in the sequence.

9. The apparatus of claim 1, wherein the first network interface controller is configured to update the consumer index associated with the buffer after receiving an acknowledgment from the second network interface controller, and the acknowledgment indicates that the second network interface controller has received the data.

10. The apparatus of claim 1, wherein the first network interface controller is further configured to remove the new work queue element from the slot after updating the consumer index.

* * * * *